(12) United States Patent
Bae et al.

(10) Patent No.: US 12,302,446 B2
(45) Date of Patent: May 13, 2025

(54) ELECTRONIC DEVICE PERFORMING OPERATION CORRESPONDING TO OVER-TEMPERATURE STATE AND METHOD FOR OPERATING THEREOF

(71) Applicant: SAMSUNG ELECTRONICS CO., LTD., Suwon-si (KR)

(72) Inventors: Janggun Bae, Suwon-si (KR); Kyoungho Lee, Suwon-si (KR); Sungsick Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 501 days.

(21) Appl. No.: 17/713,352

(22) Filed: Apr. 5, 2022

(65) Prior Publication Data

US 2022/0408517 A1    Dec. 22, 2022

Related U.S. Application Data

(63) Continuation of application No. PCT/KR2022/004600, filed on Mar. 31, 2022.

(30) Foreign Application Priority Data

Jun. 16, 2021   (KR) ........................ 10-2021-0078270

(51) Int. Cl.
*H04W 76/30* (2018.01)
*G01K 3/00* (2006.01)
(Continued)

(52) U.S. Cl.
CPC ............ *H04W 76/30* (2018.02); *G01K 3/005* (2013.01); *H04W 48/16* (2013.01); *H04W 76/10* (2018.02); *H04W 36/1443* (2023.05)

(58) Field of Classification Search
CPC ..... H04W 76/30; H04W 48/16; H04W 76/10; H04W 36/1443; H04W 48/18; H04W 88/06; H04W 8/22; G01K 3/005
See application file for complete search history.

(56) References Cited

U.S. PATENT DOCUMENTS

2008/0200220 A1   8/2008   Jackson
2011/0105173 A1   5/2011   Haim et al.
(Continued)

FOREIGN PATENT DOCUMENTS

CN   110831096   2/2020
CN   112954730   6/2021
(Continued)

OTHER PUBLICATIONS

Search Report and Written Opinion issued Jun. 23, 2022 in counterpart International Patent Application No. PCT/KR2022/004600.
(Continued)

*Primary Examiner* — Eric Myers
(74) *Attorney, Agent, or Firm* — Nixon & Vanderhye, P.C.

(57) ABSTRACT

According to various embodiments, an electronic device may include at least one processor and a sensor module, wherein the at least one processor is configured to, while a first connection to a first network is established based on a first RAT, identify that the electronic device is in over-temperature state based on sensing data from the sensor module, based on identifying that the electronic device is in the over-temperature state, identify whether a specified application is executed or not, based on identifying that the specified application is executed, release the first connection without receiving a connection release message from the first network, after the first connection is released, perform a scan associated with a second RAT different from the first RAT, based on a result of the scan, establish a second
(Continued)

connection with a second network different from the first network based on the second RAT. An electronic device comprising at least one processor, wherein the at least one processor is configured to, identify an over-temperature state in a state of being connected to a first RAT, based on the identification of the over-temperature state, identify whether a connection for the first RAT is maintainable, based on identifying that the connection for the first RAT is maintainable, perform at least one first operation corresponding to the over-temperature state while maintaining the connection for the first RAT, and based on identifying that the connection for the first RAT is not maintainable, perform at least one second operation for establishing. Various other embodiments are possible.

21 Claims, 21 Drawing Sheets

(51) Int. Cl.
*H04W 36/14* (2009.01)
*H04W 48/16* (2009.01)
*H04W 76/10* (2018.01)

(56) References Cited

U.S. PATENT DOCUMENTS

| | | |
|---|---|---|
| 2013/0332720 A1 | 12/2013 | Gupta |
| 2014/0256319 A1 | 9/2014 | Lee |
| 2018/0199185 A1 | 7/2018 | Tenny et al. |
| 2019/0379427 A1 | 12/2019 | Geekie et al. |
| 2020/0128479 A1 | 4/2020 | Xu et al. |
| 2020/0174543 A1 | 6/2020 | Hong |
| 2021/0105694 A1 | 4/2021 | Jia |
| 2022/0159540 A1 | 5/2022 | Park et al. |
| 2023/0024741 A1 | 1/2023 | Luo et al. |
| 2023/0276518 A1* | 8/2023 | Zhi ........................ H04W 76/30 370/329 |

FOREIGN PATENT DOCUMENTS

| | | |
|---|---|---|
| EP | 3 661 274 | 6/2020 |
| JP | 2019-115422 | 7/2019 |
| KR | 10-2014-0111428 | 9/2014 |
| KR | 10-2015-0016997 | 2/2015 |
| KR | 10-2019-0102278 | 9/2019 |
| KR | 10-2020-0123594 | 10/2020 |
| WO | 2013/185004 | 12/2013 |
| WO | 2020/091461 | 5/2020 |

OTHER PUBLICATIONS

Venkata, Madhusudan Kinthada, "Thermal Mitigation at User Equipment Based on Ambient Temperature," Technical Disclosure Commmons, Defensive Publications Series, Apr. 11, 2021, pp. 1-11.
Extended Search Report issued Jun. 27, 2023 in counterpart European Patent Application No. 22711855.1.
Communication pursuant to Article 94(3) EPC dated May 14, 2024 in European Patent Application No. 22711855.1.

* cited by examiner

ELECTRONIC DEVICE PERFORMING OPERATION CORRESPONDING TO OVER-TEMPERATURE STATE AND METHOD FOR OPERATING THEREOF

CROSS-REFERENCE TO RELATED APPLICATIONS

This application is a continuation of International Application No. PCT/KR2022/004600 designating the United States, filed on Mar. 31, 2022, in the Korean Intellectual Property Receiving Office and claiming priority to Korean Patent Application No. 10-2021-0078270, filed on Jun. 16, 2021, in the Korean Intellectual Property Office, the disclosures of which are incorporated by reference herein in their entireties.

BACKGROUND

Field

The disclosure relates to an electronic device for performing an operation corresponding to an over-temperature state and a method for operating the same.

Description of Related Art 5G communication systems have been developed to satisfy wireless data traffic demands that have been increasing since commercialization of 4G communication systems. In order to accomplish high data transmission rates, it has been considered to implement 5G communication systems to be able to use not only conventional communication bands (for example, 3G, LTE), but also new bands, for example, super-high-frequency bands (for example, FR2 band). Multiple antenna modules may be packaged in an electronic device supporting mmWave which is a super-high-frequency band. Wireless channels in mmWave bands have a high level of straightness and a severe path loss due to high frequency characteristics. As such, highly directional beamforming technology is desirable, and multiple antenna modules are desirable for highly directional beamforming. For example, an electronic device may have multiple antenna modules packaged to radiate signals in different directions.

5G communication technologies may transmit a relatively large amount of data, may consume more power, and may potentially increase the temperature of electronic devices. For example, power consumption by electronic devices increases inevitably due to high-frequency band use and increased amounts of data processing, and this may increase the amount of generated heat, thereby causing overheating of the antenna module in use or the periphery thereof. Overheating of a specific antenna module or the periphery thereof may cause discomfort to the use of the electronic device and may potentially even result in a low-temperature burn of a user. Components (for example, a battery) disposed near the overheated antenna module may be damaged, and the overall performance of the electronic device may be degraded. In addition, the electronic device may have installed thereon and use various applications including data transmission/reception functions through 5G communication. If the electronic device executes an application that transmits/receives an excessive amount of data through 5G communication, use of high frequency bands and increased amounts of data processing may further increase the amount of heating.

SUMMARY

Embodiments of the disclosure provide an electronic device and a method for operating the same which may perform, based on an over-temperature state being identified while being connected to a specific radio access technology (RAT), at least one operation for connecting a RAT different from the specific RAT, based on identifying that connection to the specific RAT is not maintainable.

According to various example embodiments, an electronic device may include at least one processor and a sensor module, wherein the at least one processor is configured to, while a first connection to a first network is established based on a first RAT, identify that the electronic device is in over-temperature state based on sensing data from the sensor module, based on identifying that the electronic device is in the over-temperature state, identify whether a specified application is executed or not, based on identifying that the specified application is executed, release the first connection without receiving a connection release message from the first network, after the first connection is released, perform a scan associated with a second RAT different from the first RAT, based on a result of the scan, establish a second connection with a second network different from the first network based on the second RAT. An electronic device comprising at least one processor, wherein the at least one processor is configured to, identify an over-temperature state in a state of being connected to a first RAT, based on the identification of the over-temperature state, identify whether a connection for the first RAT is maintainable, based on identifying that the connection for the first RAT is maintainable, perform at least one first operation corresponding to the over-temperature state while maintaining the connection for the first RAT, and based on identifying that the connection for the first RAT is not maintainable, perform at least one second operation for establishing.

According to various embodiments, a method for operating an electronic device comprising a sensor module may comprise, while a first connection to a first network is established based on a first RAT, identifying that the electronic device is in over-temperature state based on sensing data from the sensor module, based on identifying that the electronic device is in the over-temperature state, identify whether a specified application is executed or not, and wherein the method further comprises, based on identifying that the specified application is executed, releasing the first connection without receiving a connection release message from the first network, after the first connection is released, performing a scan associated with a second RAT different from the first RAT, and based on a result of the scan, establish a second connection with a second network different from the first network based on the second RAT.

According to various example embodiments, an electronic device may include at least one processor and a sensor module operatively coupled to the processor, wherein the at least one processor is configured to, while a first connection to a first network is established based on a first RAT, identify that the electronic device is in over-temperature state based on sensing data from the sensor module, based on identifying that the electronic device is in the over-temperature state, reduce the number of antennas for receiving a downlink signal, after reducing the number of the antennas for receiving the downlink signal, identify whether the electronic device is in the over over-temperature state based on other sensing data from the sensor module, based on identifying that the electronic device is in the over over-temperature state based on the other sensing data from the sensor module, release the first connection without receiving a connection release message from the first network, after the first connection is released, perform a scan associated with a second RAT different from the first RAT, based on a result of the scan, establish a second connection with a second network different from the first network based on the second RAT.

Various embodiments may provide am electronic device and a method for operating the same, wherein when an over-temperature state is identified while being connected to a specific radio access technology (RAT), at least one operation for connecting to a RAT different from the specific RAT may be performed, based on identifying that connection to the specific RAT is not maintainable. The operation of the electronic device for establishing a connection to a different RAT may eliminate the heat generated thereby preventing the electronic device from overheating. Further, the degradation in the performance of the electronic device, due to generated heat, may also be prevented.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
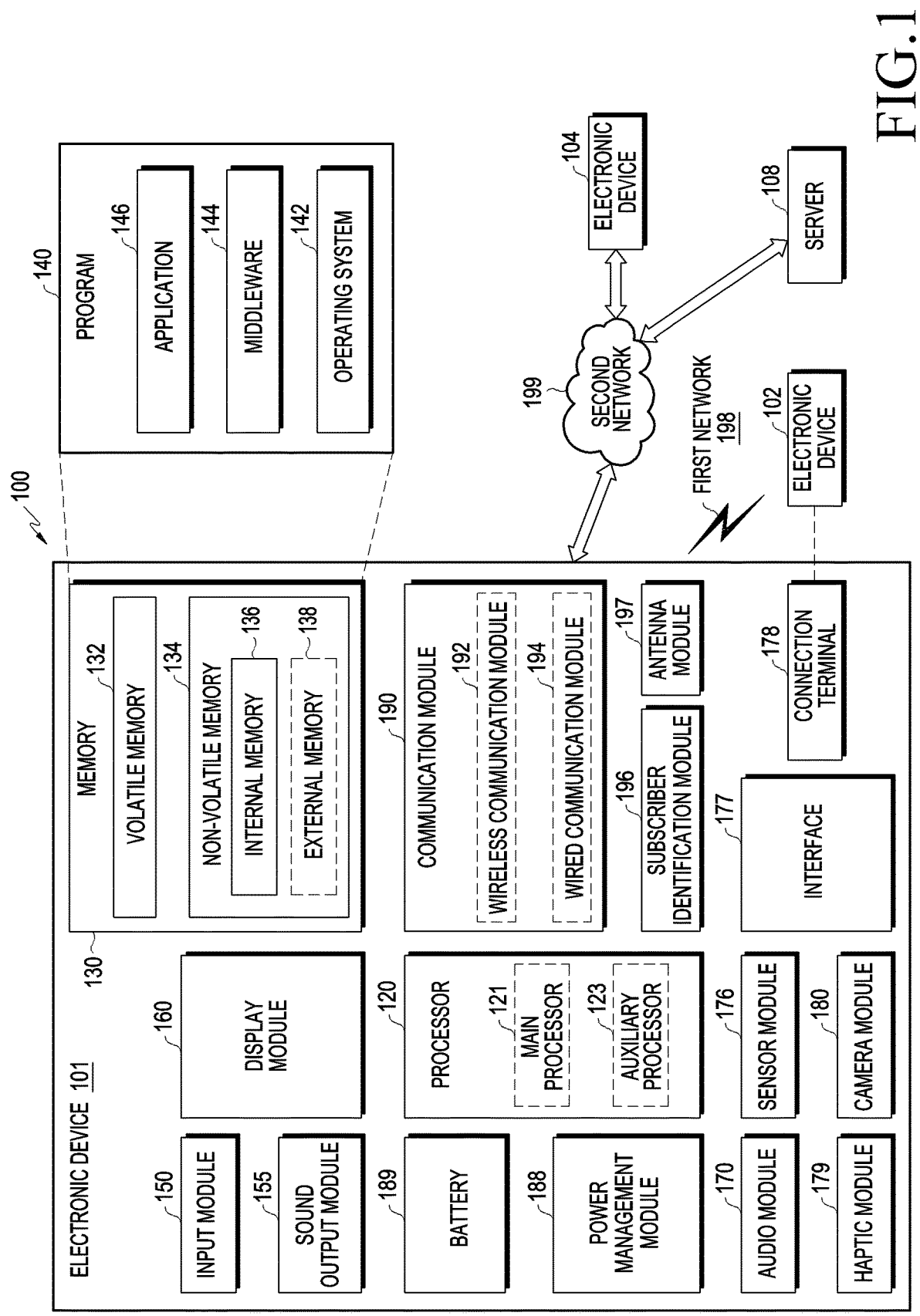
FIG. 1 is a block diagram of an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, and/or an antenna module 197. In various embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and/or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force produced by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
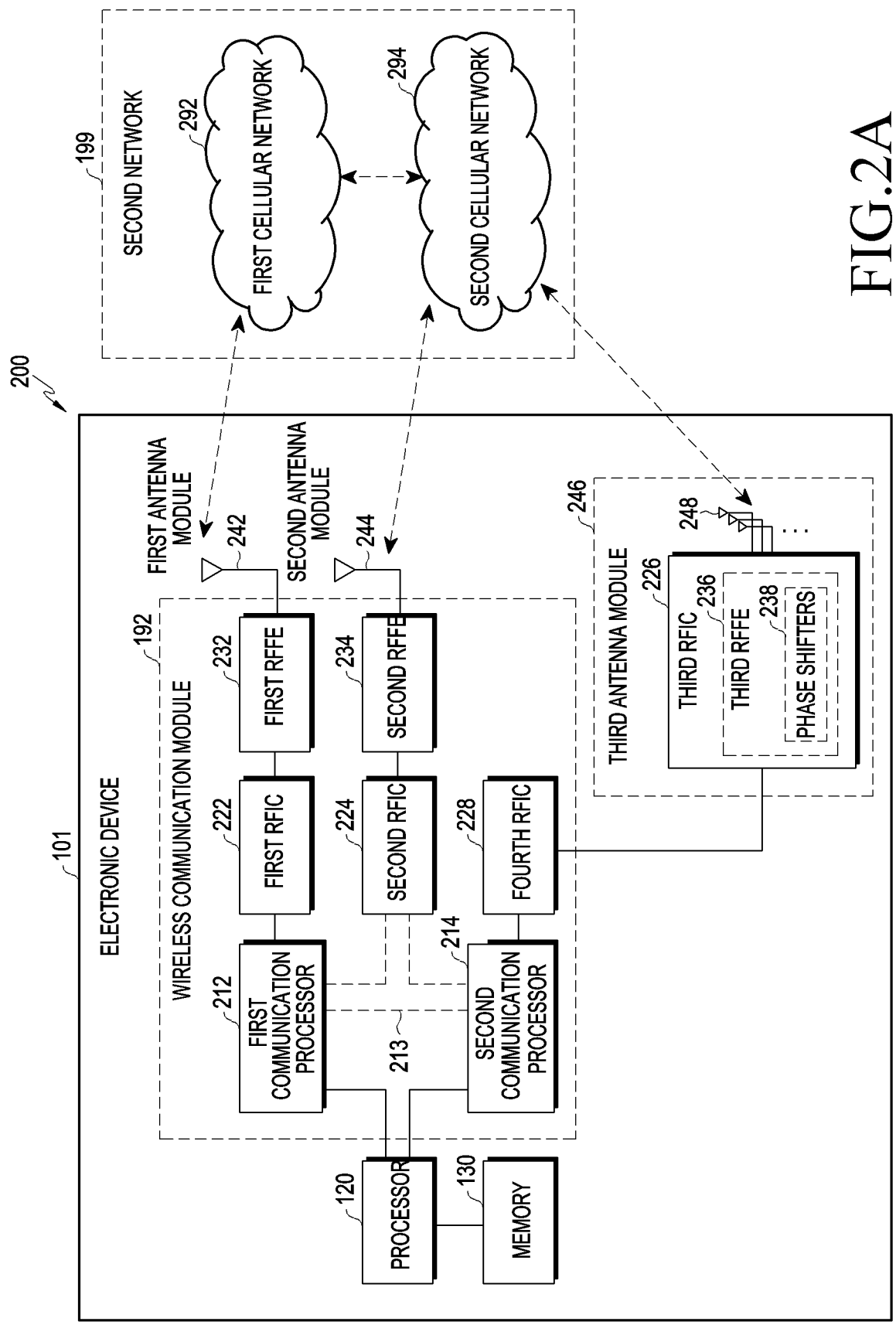
FIG. 2A is a block diagram of an example electronic device for supporting legacy network communication and 5G network communication according to various embodiments.

FIG. 2A is a block diagram 200 of an electronic device 101 for supporting legacy network communication and 5G network communication according to various embodiments. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may include the processor 120 and the memory 130. The second network 199 may include a first cellular network 292 (e.g., a legacy network) and a second cellular network 294 (e.g., a 5G network). According to an embodiment, the electronic device 101 may further include at least one component among the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to an embodiment, the fourth RFIC 228 may be omitted or may be included as a part of the third RFIC 226.

The first communication processor 212 may establish a communication channel of a band to be used for wireless communication with the first cellular network 292, and may support legacy network communication via the established communication channel According to various embodiments, the first cellular network may be a legacy network including 2G, 3G, 4G, or long term evolution (LTE) network. The second communication processor 214 may establish a communication channel corresponding to a designated band (e.g., approximately 6 GHz to 60 GHz) among bands to be used for wireless communication with the second cellular network 294, and may support 5G network communication via the established communication channel. According to various embodiments, the second cellular network 294 may be a 5G network defined in $3^{rd}$ generation partnership project (3GPP). Additionally, according to an embodiment, the first communication processor 212 or the second communication processor 214 may establish a communication channel corresponding to another designated band (e.g., lower than 6 GHz) among bands to be used for wireless communication with the second cellular network 294, and may support 5G network communication via the established channel.

The first communication processor 212 may transmit data to or receive data from the second communication processor 214. For example, data that has been classified to be transmitted through the second cellular network 294 may be changed to be transmitted through the first cellular network 292. Here, the first communication processor 212 may receive transmission data from the second communication processor 214. For example, the first communication processor 212 may transmit data to or receive data from the second communication processor 214 through an inter-processor interface 213. The inter-processor interface 213 may be implemented as, for example, a universal asynchronous receiver/transmitter (UART) (e.g., high speed-UART (HS-UART) or a peripheral component interconnect bus express (PCIe) interface, but there is no limitation on the type of interface. Alternatively, the first communication processor 212 and the second communication processor 214 may exchange control information and packet data information by using, for example, a shared memory. The first communication processor 212 may transmit to or receive from the second communication processor 214 various pieces of information such as sensing information, information on output strength, and resource block (RB) allocation information.

Depending on the implementation, the first communication processor 212 may not be directly connected to the second communication processor 214. Here, the first communication processor 212 may transmit data to or receive data from the second communication processor 214 through the processor 120 (e.g., an application processor). For example, the first communication processor 212 and the second communication processor 214 may transmit or receive data through the processor 120 (e.g., an application processor) and an HS-UART interface or a PCIe interface, but there is no limitation on the type of interface. Alternatively, the first communication processor 212 and the second communication processor 214 may exchange control information and packet data information by using the processor 120 (e.g., an application processor) and a shared memory.

Figure 2B:
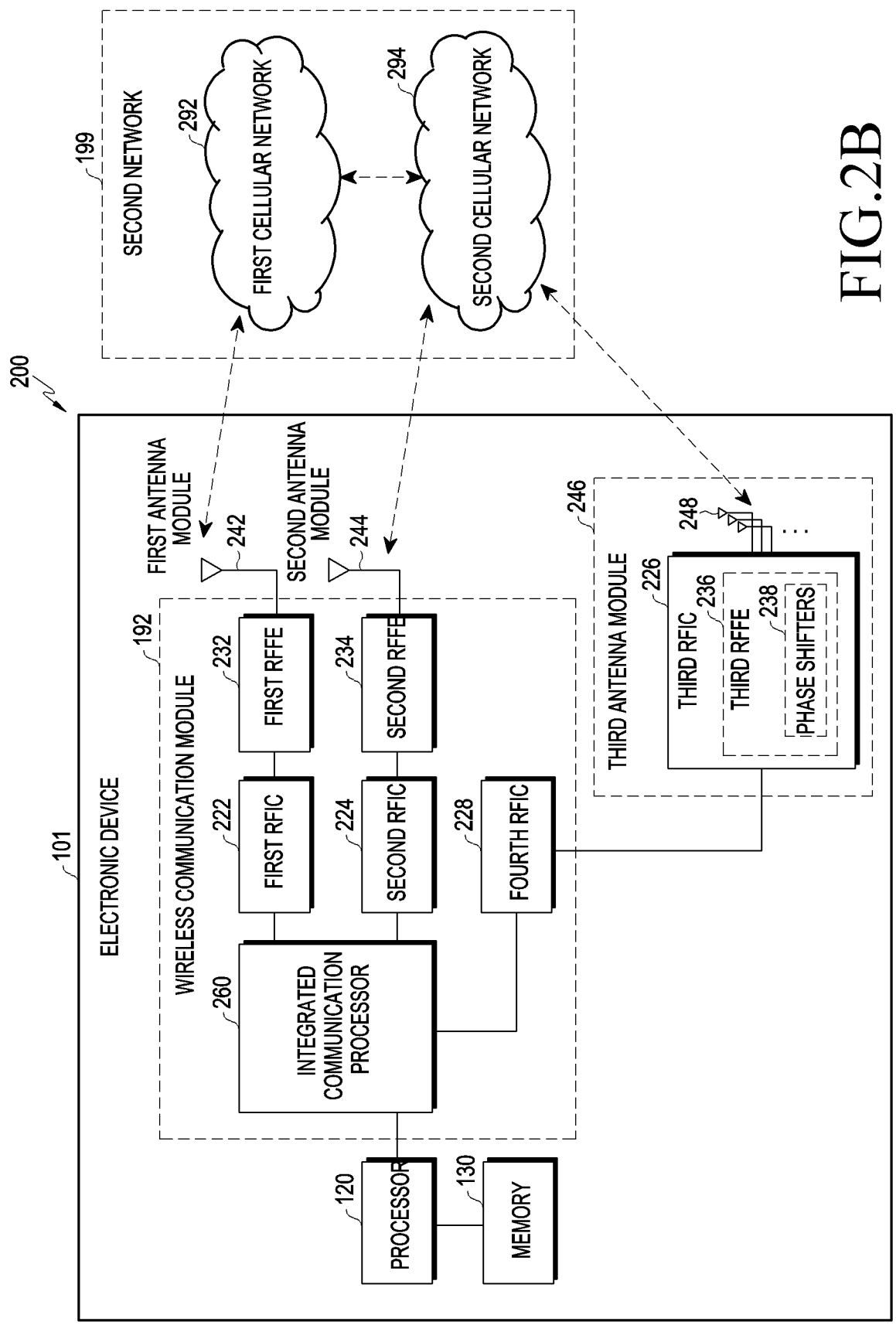
FIG. 2B is a block diagram of an example electronic device for supporting legacy network communication and 5G network communication according to various embodiments.

According to an embodiment, the first communication processor 212 and the second communication processor 214 may be implemented in a single chip or a single package. According to various embodiments, the first communication processor 212 or the second communication processor 214 may be formed in a single chip or a single package, together with the processor 120, the sub-processor 123, or the communication module 190. For example, as shown in FIG. 2B, the integrated communication processor 260 may support both functions for communication with the first cellular network 292 and the second cellular network 294.

In a case of transmission, the first RFIC 222 may convert a baseband signal generated by the first communication processor 212 into a radio frequency (RF) signal in a range of approximately 700 MHz to 3 GHz used for the first cellular network 292 (e.g., a legacy network). In a case of reception, an RF signal is obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal to a baseband signal so that the baseband signal is processed by the first communication processor 212.

In a case of transmission, the second RFIC 224 may convert a baseband signal generated by the first communication processor 212 or the second communication processor 214 into an RF signal (hereinafter, a 5G Sub6 RF signal) of a Sub6 band (e.g., 6 GHz or less) used for the second cellular network 294 (e.g., 5G network). In a case of reception, a 5G Sub6 RF signal is obtained from the second cellular network 294 (e.g., a 5G network) through an antenna (e.g., the second antenna module 244), and may be preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 and the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second cellular network 294 (e.g., 5G network). In a case of reception, a 5G Above6 RF signal is obtained from the second cellular network 294 (e.g., a 5G network) through an antenna (e.g., the antenna 248), and may be preprocessed by the third RFFE 236. The third RFIC 226 may convert the preprocessed 5G Above6 RF signal to a baseband signal so that the baseband signal is processed by the second communication processor 214. According to an embodiment, the third RFFE 236 may be implemented as a part of the third RFIC 226.

According to an embodiment, the electronic device 101 may include the fourth RFIC 228, separately from or as a part of, the third RFIC 226. In this instance, for transmission of data, the fourth RFIC 228 may convert a baseband signal generated by the second communication processor 214 into an RF signal (hereinafter, an IF signal) in an intermediate frequency band (e.g., approximately 9 GHz to 11 GHz), and may then transfer the IF signal to the third RFIC 226. The third RFIC 226 may convert the IF signal to a 5G Above6 RF signal. In a case of reception, a 5G Above6 RF signal is received from the second cellular network 294 (e.g., a 5G network) through an antenna (e.g., the antenna 248), and may be converted into an IF signal by the third RFFE 236. The fourth RFIC 228 may convert the IF signal to a baseband signal so that the baseband signal is processed by the second communication processor 214.

According to an embodiment, the first RFIC 222 and the second RFIC 224 may be implemented as a single chip or at least a part of the single package. According to various embodiments, when the first RFIC 222 and the second RFIC 224 in FIG. 2A or 2B are implemented as a single chip or a single package, they may be implemented as an integrated RFIC. Here, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as a single chip or at least a part of the single package. According to an embodiment, at least one antenna module among the first antenna module 242 and the second antenna module 244 may be omitted, or may be combined with another antenna module to process RF signals of a plurality of corresponding bands.

According to an embodiment, the third RFIC 226 and the antenna 248 may be disposed in the same substrate to form the third antenna module 246. For example, the wireless communication module 192 or the processor 120 may be disposed in a first substrate (e.g., main PCB). In this case, the third RFIC 226 may be disposed on a portion (e.g., a lower surface) of a second substrate (e.g., a sub-PCB) separate from the first substrate, and the antenna 248 may be disposed on another portion (e.g., an upper surface) thereof, thereby forming the third antenna module 246. By disposing the third RFIC 226 and the antenna 248 in the same substrate, the length of a transmission line therebetween can be reduced. For example, this can reduce a loss (e.g., attenuation) of a signal in a high-frequency band (e.g., approximate 6 GHz to 60 GHz) used for 5G network communication, the loss being caused by a transmission line. Accordingly, the electronic device 101 can improve the quality or speed of communication with the second cellular network 294 (e.g., 5G network).

According to an embodiment, the antenna 248 may be formed as an antenna array including a plurality of antenna elements used for beamforming. In this case, the third RFIC 226 may include a plurality of phase shifters 238 corresponding to the plurality of antenna elements, for example, as a part of the third RFFE 236. In transmission, each of the plurality of phase shifters 238 may convert the phase of a 5G Above6 RF signal to be transmitted to an outside (e.g., a base station in the 5G network) of the electronic device 101 through a corresponding antenna element. In reception, each of the plurality of phase shifters 238 may convert the phase of a 5G Above6 RF signal, received from the outside through a corresponding antenna element, into the same or substantially the same phase. Accordingly, it is possible to enable transmission or reception through beamforming between the electronic device 101 and the outside.

The second cellular network 294 (e.g., the 5G network) may operate independently of the first cellular network 292 (e.g., the legacy network) (e.g., in a standalone (SA) manner) or may operate in connection therewith (e.g., in a non-standalone (NSA) manner). For example, the 5G network may have only an access network (e.g., a 5G radio access network (RAN) or a next-generation RAN (NG RAN)) without having a core network (e.g., a next-generation core (NGC)). In this case, the electronic device 101 may access the access network of the 5G network, and may then access an external network (e.g., the Internet) under the control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by a different component (e.g., the processor 120, the first communication processor 212, or the second communication processor 214).

Meanwhile, the processor 120 and the communication processor e. g. at least one of the first communication processor 212, the second communication processor 214, or the jntegrated communication processor 260 may be implemented as at least one integrated circuit, and in this case, it may include at least one storage circuit for storing at least one instruction for causing at least one operation to be performed according to various embodiments, and at least one processing circuit for executing the at least one instruction.

Figure 3:
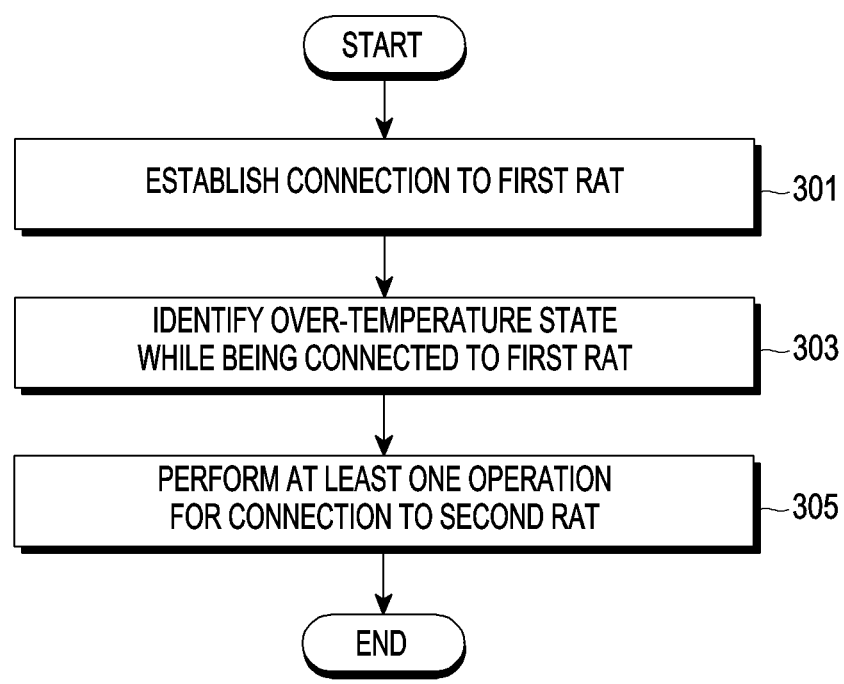
FIG. 3 is a flowchart illustrating an example method for operating an electronic device according to various embodiments.

FIG. 3 is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to a first RAT in operation 301. For example, a connection to the first RAT may denote a connection based on the first RAT. For example, the electronic device 101 may establish a radio resource control (RRC) connection with the network based on the first RAT. For example, the electronic device 101 may be in an RRC connected state after establishing an RRC connection, but there is no limitation in an RRC state in which the electronic device 101 may exist (e.g. RRC connected state, RRC idle state, or RRC inactive state). The electronic device 101 may transmit and/or receive a signal based on the first RAT to and/or from the network while being connected to the first RAT. For example, the first RAT may be NR, and the electronic device 101 may establish a connection based on the NR of standalone (SA). Heat may be generated in the electronic device 101 due to transmission and/or reception of a signal based on NR. For example, when the electronic device 101 supports the first RAT and a second RAT, it is assumed that the magnitude of the heat generated when the first RAT is used is larger than the magnitude of the heat generated when the second RAT is used. The second RAT may be, for example, evolved universal mobile telecommunications system (UMTS) terrestrial radio access (E-UTRA), but is not limited thereto.

According to various embodiments, in operation 303, the electronic device 101 may identify an over-temperature state while being connected to the first RAT. For example, the electronic device 101 may include a sensor module 176 for measuring a temperature inside (or on a surface) of the electronic device 101. The electronic device 101 may determine, as an over-temperature state, an indication of an over-temperature indicating that the measured temperature is equal to or greater than a threshold temperature. Alternatively, the electronic device 101 may operate based on the measured temperature. For example, when the electronic device 101 executes an application that requires transmission and reception of large data (e.g., a game application or a streaming application), an over-temperature state based on transmission and/or reception of a signal based on the first RAT may occur.

According to various embodiments, in operation 305, the electronic device 101 may perform at least one operation for establishing a connection to the second RAT. For example, the electronic device 101 may release the connection to the first RAT and perform at least one operation for the connection to the second RAT.

In one example, based on receiving a connection release command from a network of the first RAT (e.g., RRC release message (e.g., RRC release message of technical specification (TS) 38.331 of 3GPP, or RRC connection release message of 3GPP TS 36.331)), the electronic device 101 may release the connection to the first RAT and perform at least one operation for connection to the second RAT. The electronic device 101 may determine whether it is necessary to wait for a connection release command from the network, and various examples will be described below. When it is determined that it is necessary to wait for a connection release command from the network, the electronic device 101 may wait for a connection release command from the network while being connected to the first RAT. For example, when the RRC release command is received from the network and system information (e.g., system information block (SIB) 5) for cell reselection has been previously received, the electronic device 101 may perform at least one operation for cell reselection based on system information. For example, when the RRC release command is received from the network and system information (e.g., SIB 5) for cell reselection has not been previously received, the electronic device 101 may scan the second RAT and thus perform at least one operation for connection to the second RAT. The at least one operation may be referred to as Public Land Mobile Network (PLMN) search (e.g., LTE PLMN search when the second RAT is E-UTRA).

In another example, the electronic device 101 may determine that there is no need to wait for a connection release command from the network. Here, the electronic device 101 may confirm (or declare) a radio link failure (RLF) and may perform at least one operation for connection to the second RAT. The electronic device 101 may perform a scan based on previously received system information (e.g., SIB 5) and/or a measurement configuration (measconfig) for the second RAT (e.g., a measurement object included in the measurement configuration) for example. The electronic device 101 may perform at least one procedure for connection to the network of the second RAT based on the scan result.

As described above, the electronic device 101 may perform at least one procedure for connection to the second RAT based on the identification of the over-temperature state while being connected to the first RAT, and the corresponding operation may be called a RAT fallback. The transition from NR to E-UTRA may be called, for example, an LTE fallback. In an embodiment, the electronic device 101 may be configured to perform at least one procedure for connection to the second system based on the identification of the over-temperature state while being connected to a first system, and the corresponding operation may also be called a system fallback. The transition from a 5th generation system (5GS) to an evolved packet system (EPS) may be called an EPS fallback for example. It will be understood by those skilled in the art that a configuration configured to perform RAT fallback in various embodiments may be replaced with a configuration configured to perform system fallback. In addition, the electronic device 101 according to various embodiments may perform RAT switching from E-UTRA to Wideband Code Division Multiple Access (WCDMA) (or Global System for Mobile Communications (GSM)) or RAT switching from NR to WCDMDA (or GSM), as well as RAT switching to E-UTRA from NR in an over-temperature state.

Figure 4A:
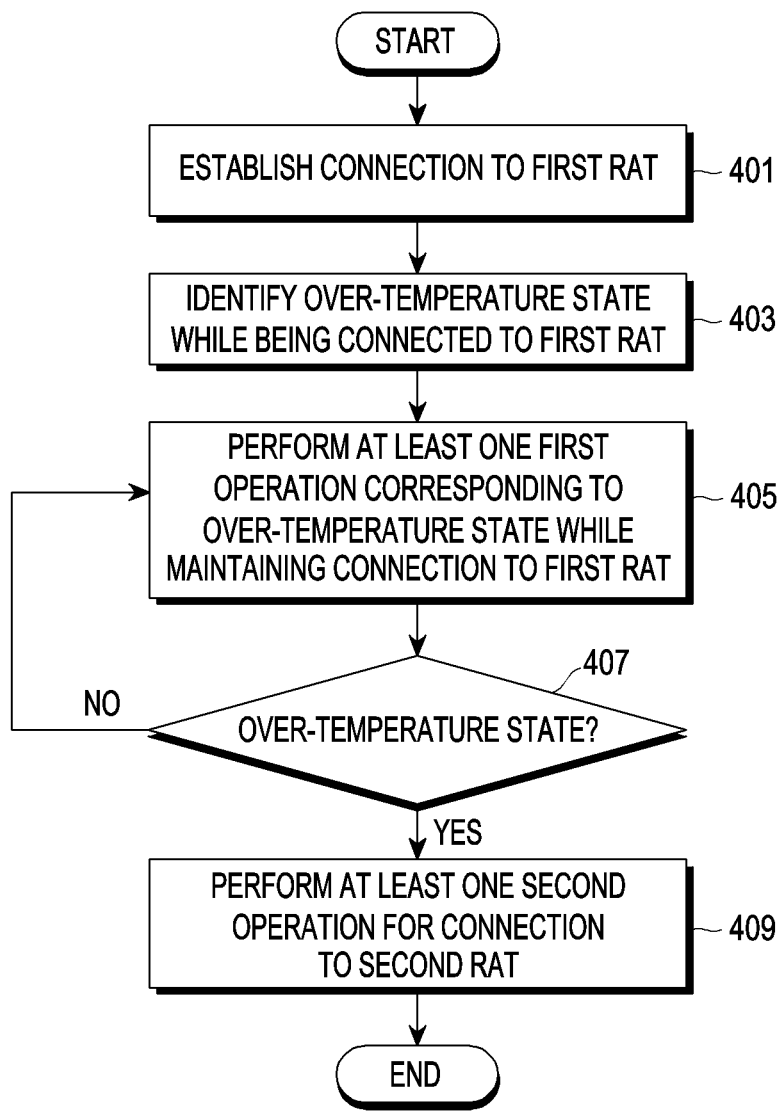
FIG. 4A is a flowchart illustrating an example method for operating an electronic device according to various embodiments.

FIG. 4A is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to a first RAT in operation 401. In operation 403, the electronic device 101 may identify an over-temperature state while being connected to the first RAT. For example, the electronic device 101 may identify that the current state is an over-temperature state based on identifying that the temperature measured by the sensor module 176 is equal to or greater than a threshold temperature. For example, the electronic device 101 may identify that the current state is an over-temperature state, based on identifying that the rate of increase in the measured temperature (or the slope of increase) is equal to or greater than a threshold rate (or threshold slope). There is no limitation to an indicator (or condition) indicating the over-temperature state.

According to various embodiments, in operation 405, the electronic device 101 may perform at least one first operation corresponding to the over-temperature state while maintaining the connection to the first RAT based on the identification of the over-temperature state. The at least one first operation may, foe example, be an operation capable of reducing the amount of heat generated by the electronic device 101 without requiring RAT switching, that is, while maintaining a connection to the current RAT.

In various embodiments, the first operation may, for example, be reduction in the number of antennas for transmitting an uplink signal and/or reduction in the number of antennas for receiving a downlink signal. As the number of antennas used for signal transmission and/or reception is relatively large, the amount of heat generated by the electronic device 101 may be relatively large. Accordingly, in the over-temperature state, the electronic device 101 may perform a first operation of reducing the number of used antennas. Adjustment of the number of antennas may not require RAT switching.

In various embodiments, the first operation may, for example, be reduction in transmission power for at least some of channels for the uplink signal. As the transmission power is relatively large, the amount of heat generated by the electronic device 101 may be relatively large. Accordingly, in the over-temperature state, the electronic device 101 may perform a first operation of reducing the transmission power of at least some of the channels for the uplink signal. Adjustment of transmission power may not require RAT switching.

In various embodiments, the first operation may, for example, be adjustment of an information element of user equipment (UE) capability associated with the first RAT. For example, the electronic device 101 may perform at least one of changing an information element associated with carrier aggregation (CA) of UE capability (e.g., deactivation and/or component carrier (CC) reduction) and/or changing (e.g., deactivating) an information element associated with dual connectivity (DC), changing (e.g., decreasing) an information element associated with a layer, changing (e.g., decreasing) an information element associated with a bandwidth, changing (e.g., decreasing) an information element associated with a modulation and coding scheme (MCS), or changing an information element associated with a sounding reference signal (SRS) (e.g., SRS antenna reduction and/or deactivation). There is no limitation on the type of information element to be changed as long as the connection to the first RAT can be maintained.

The amount of heat generated in the electronic device 101 when CA and/or DC is performed may be greater than the amount of heat generated in the electronic device 101 when CA and/or DC is not performed. The electronic device 101 may deactivate CA and/or DC in the over-temperature state, and thus the possibility of resolving the over-temperature state may increase. Meanwhile, when CA is performed, as CA is performed based on a relatively larger number of CCs, the amount of heat generated by the electronic device 101 may be relatively large. The electronic device 101 may relatively reduce the number of CCs used for CA as the first operation in the over-temperature state, and thus the possibility of resolving the over-temperature state may increase. Adjustment of information elements associated with CA and/or DC may not require RAT switching.

In various embodiments, in one example, the electronic device 101 may change an information element associated with a layer. For example, the electronic device 101 may change (e.g., reducing from 4 layers to 2 layers) at least one of maxNumberMIMO-LayersPDSCH (Physical Downlink Shared Channel) of FeatureSetDownlinkPerCC, maxNumberMIMO-LayersCB-PUSCH (Physical Uplink Shared Channel) of FeatureSetUplinkPerCC, or maxNumberMIMO-LayersNonCB-PUSCH of FeatureSetUplinkPerCC of UE capability. As communication is performed based on a relatively larger number of layers, the amount of heat generated by the electronic device 101 may be relatively large. The electronic device 101 may relatively reduce the number of layers as a first operation in the over-temperature state, and thus the possibility of resolving the over-temperature state may increase. Adjustment of the information element associated with the layer may not require RAT switching.

In various embodiments, the electronic device 101 may change an information element associated with a bandwidth as a first operation. For example, the electronic device 101 may change at least one of SupportedBandwidthDL and/or ChannelBW-90 MHz of FeatureSetDownlinkPerCC, or SupportedBandwidthUL and/or ChannelBW-90 MHz of FeatureSetUplinkPerCC of UE capability. As communication is performed based on a relatively larger bandwidth, the amount of heat generated by the electronic device 101 may be relatively large. The electronic device 101 may relatively lower the bandwidth in the over-temperature state, and thus the possibility of resolving the over-temperature state may increase. For example, the electronic device 101 may reduce information (e.g., a bandwidth value) of SupportedBandwidthDL and/or SupportedBandwidthUL, and/or may deactivate ChannelBW-90 MHz. In one example, the electronic device 101 may reduce the bandwidth to an initial carrier bandwidth, but this is merely and example and there is no limitation to the value of the bandwidth after the reduction. For example, when the initial carrier bandwidth is equal to or greater than a threshold bandwidth (e.g., 10 MHz or 20 MHz), the electronic device 101 may reduce the bandwidth to the initial carrier bandwidth (or another value), and may change the bandwidth to a designated value (e.g., 10 MHz) when the initial carrier bandwidth is less than the threshold bandwidth. Adjustment of the bandwidth-related information element may not require RAT switching.

According to various embodiments, the electronic device 101 may change an information element associated with a modulation and coding scheme (MCS). As communication is performed based on a relatively larger number of MCSs, the amount of heat generated by the electronic device 101 may be relatively large. For example, the electronic device 101 may decrease (e.g., decrease from 256 QAM to 64 QAM) at least one of supportedModulationOrderDL of FeatureSetDownlinkPerCC or supportedModulationOrderUL of FeatureSetUplinkPerCC of UE capability. The electronic device 101 may relatively decrease the number of MCSs as the first operation in the over-temperature state, and thus the possibility of resolving the over-temperature state may increase. Adjustment of the information element associated with the MCS may not require RAT switching.

According to various embodiments, the electronic device 101 may change an information element associated with a sounding reference signal (SRS). For example, the electronic device 101 may change the srs-TxSwitch parameter of the BandCombinationList of the UE capability to "not supported". The amount of heat generated by the electronic device 101 when SRS transmission is performed may be greater than the amount of heat generated by the electronic device 101 when SRS transmission is not performed. The electronic device 101 may deactivate transmission of the SRS as a first operation in the over-temperature state, and thus the possibility of resolving the over-temperature state may increase. Adjustment of the information element associated with the SRS may not require RAT switching. Meanwhile, in addition to the above-described examples of the first operation, an operation for reducing the amount of heat generated from the electronic device 101 may be performed without limitation.

According to various embodiments, after the at least one first operation is performed, the electronic device 101 may determine whether the current state is an over-temperature state in operation 407. In one example, the condition for determining whether the current state is the over-temperature state in operation 407 may be the same as, for example, the condition for determining whether the current state is the over-temperature state in operation 403 before the at least one first operation is performed. In another example, the condition for determining whether the current state is the over-temperature state in operation 407 may be configured to be different from, for example, the condition for determining whether the current state is in the over-temperature state in operation 403 before the at least one first operation is performed. For example, the electronic device 101 determines whether the temperature measured in operation 407 is equal to or greater than a threshold temperature, but the threshold temperature in operation 407 may be configured to be different from the threshold temperature in operation 403. For example, the electronic device 101 determines whether the rate of increase (or slope) in the temperature measured in operation 407 is equal to or greater than a threshold rate (or threshold slope), but the threshold rate (or threshold slope) in operation 407 may be configured to be different from the threshold rate (or threshold slope) in operation 403. Alternatively, instead of operation 407, the electronic device 101 may be configured to determine whether the measured temperature is decreasing.

According to various embodiments, when the current state is not in the over-temperature state ("no" in operation 407), the electronic device 101 may, for example, perform (or continue to perform) at least one first operation. Alternatively, the electronic device 101 may be configured to stop performing at least one first operation when the current state is not in the over-temperature state, which will be described with reference to FIG. 4B. In the over-temperature state ("yes" in operation 407), the electronic device 101 may, for example, perform at least one second operation for connection to the second RAT. For example, the electronic device 101 may perform at least one second operation for connection to the second RAT described above in connection with FIG. 3, which will be described below.

Figure 4B:
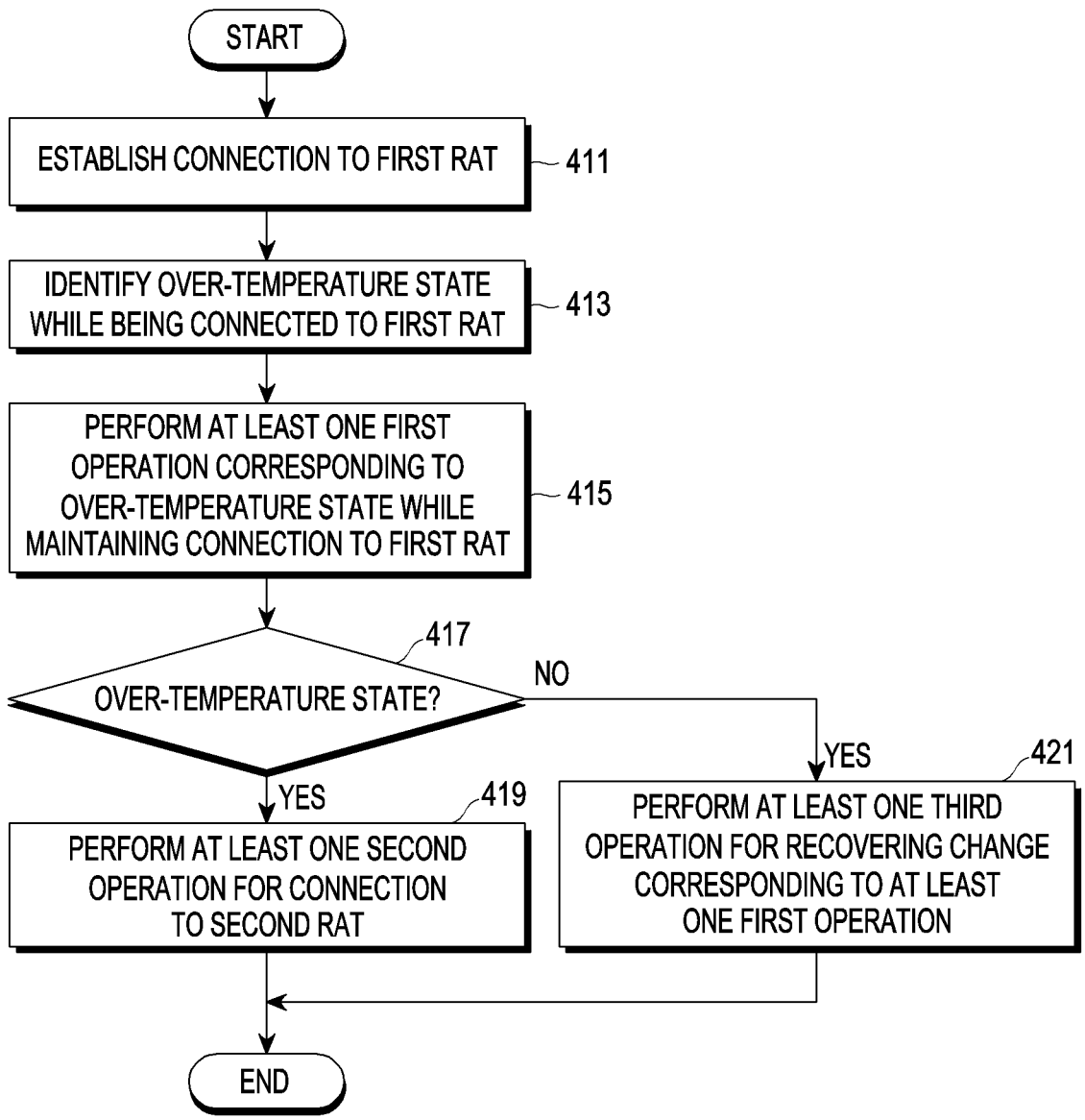
FIG. 4B is a flowchart illustrating an example method for operating an electronic device according to various embodiments.

FIG. 4B is a flowchart illustrating an example method for operating an electronic device according to various embodiments. Operations 411, 413, 415, and 417 in FIG. 4B may be substantially the same as or similar to operations 401, 403, 405, and 407 in FIG. 4A, respectively. Thus, the corresponding operations are briefly described here, and similar operations in the following flowcharts are also briefly described.

According to various embodiments, the electronic device 101 (e.g., at least one of the processor 120, the first communication processor 212, the second communication processor 214, or the integrated communication processor 260) may establish a connection to the first RAT in operation 411. In operation 413, the electronic device 101 may identify an over-temperature state while maintaining the connection to the first RAT. In operation 415, the electronic device 101 may perform at least one first operation corresponding to the over-temperature state while maintaining the connection to the first RAT.

According to various embodiments, in a case of an over-temperature state (e.g., "yes" in operation 417), the electronic device 101 may perform, for example, at least one second operation for connection to the second RAT. For example, the electronic device 101 may perform at least one second operation for connection to the second RAT described in association with FIG. 3, which will be described below. If it is not an over-temperature state ("no" in operation 417), the electronic device 101 may perform at least one third operation to recover a change corresponding to the at least one first operation in operation 421 (or reverse or undo). For example, the third operation may be an operation of restoring a configuration changed by the first operation to a configuration before the change. For example, the third operation may be an operation of increasing the number of antennas for uplink signal transmission and/or increasing the number of antennas for downlink signal reception. For example, the third operation may be an operation of increasing transmission power for at least some of the channels for the uplink signal. As the transmission power is relatively large, the amount of heat generated by the electronic device 101 may be relatively large. Accordingly, in the over-temperature state, the electronic device 101 may perform reducing of the transmission power of at least some of the channels for the uplink signal as a first operation. Adjustment of transmission power may not require RAT switching. For example, the third operation may be adjustment of an information element of UE capability associated with the first RAT. For example, the electronic device 101 may perform at least one of changing an information element associated with carrier aggregation (CA) of UE capability (e.g., activation and/or CC increase) and/or changing (e.g., activating) an information element associated with dual connectivity (DC), changing (e.g., increasing) an information element associated with a layer, changing (e.g., increasing) an information element associated with a bandwidth, changing (e.g., increasing) an information element associated with a modulation and coding scheme (MCS), or changing an information element associated with a sounding reference signal (SRS) (e.g., SRS antenna increase and/or activation). There is no limitation on the type of information element to be changed as long as the connection to the first RAT can be maintained. In addition, according to performance of the at least one third operation, the state of the electronic device 101 may be changed to be the same as (e.g., restored to) the state before the at least one first operation is performed. However, in some cases, the state of the electronic device 101 after the third operation is performed may be different from the state before the at least one first operation is performed.

Figure 4C:
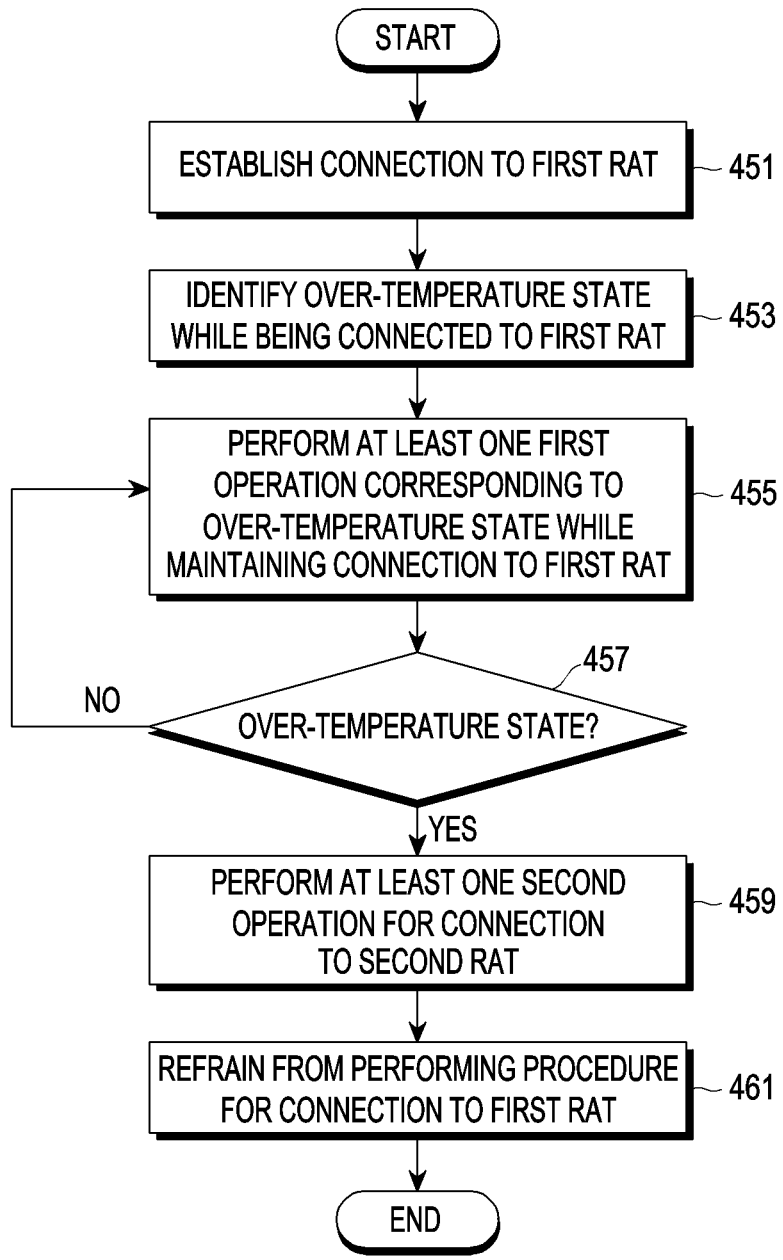
FIG. 4C is a flowchart illustrating an example method for operating an electronic device according to various embodiments.

FIG. 4C is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 451. In operation 453, the electronic device 101 may identify an over-temperature state while maintaining the connection to the first RAT. In operation 455, the electronic device 101 may perform at least one first operation corresponding to the over-temperature state while maintaining the connection to the first RAT. In operation 457, the electronic device 101 may determine whether the current state is an over-temperature state after performing the at least one first operation. If the current state is not the over-temperature state ("no" in operation 457), the electronic device 101 may continue to perform at least one first operation or may perform at least one third operation as described above with reference to FIG. 4B. In a case of an over-temperature state ("yes" in operation 457), the electronic device 101 may perform at least one second operation for connection to the second RAT in operation 459. Accordingly, the electronic device 101 may release the connection to the first RAT and establish a connection to the second RAT.

According to various embodiments, in a state of being connected to the second RAT, the electronic device 101 may refrain from a procedure for connecting to the first RAT in operation 461. For example, the electronic device 101 may refrain from performing an operation associated with inter-RAT (e.g., at least one of cell reselection, inter-RAT handover, or measurement of MO of inter-RAT). In one example, NAS may provide a command to block the operation associated with the inter-RAT to AS, but there is no limitation to the type of operation for refraining from the procedure for connection to the first RAT. Accordingly, as the electronic device 101 is not connected to the first RAT again, a case in which the over-temperature state is not resolved may not occur. Meanwhile, although not shown, when the over-temperature state is resolved, the electronic device 101 may perform at least one procedure for reconnecting to the first RAT. For example, the electronic device 101 may be configured to resume an operation associated with inter-RAT that the electronic device has been refrained from performing (e.g., at least one of cell reselection, inter-RAT handover, or measurement of MO of inter-RAT).

Figure 5:
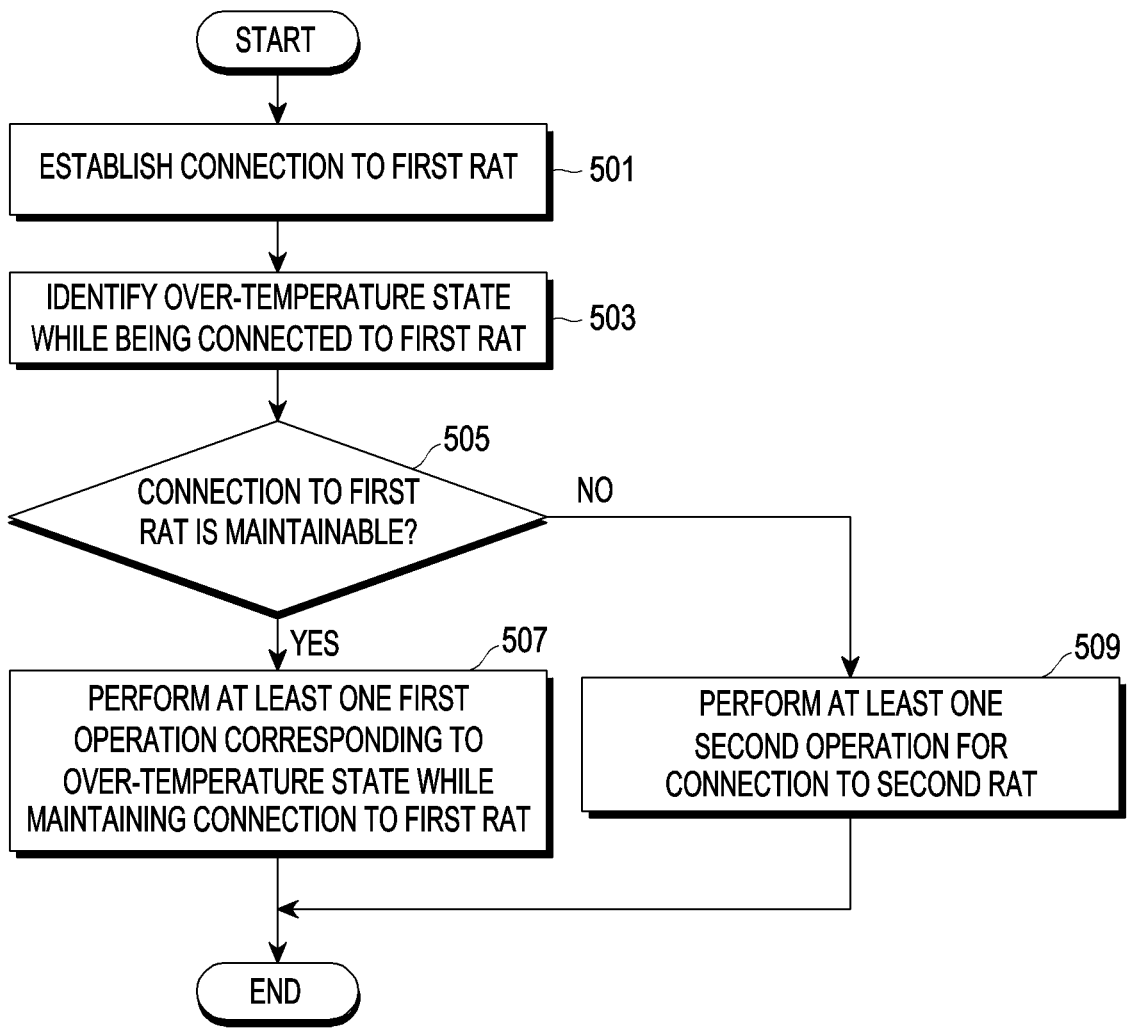
FIG. 5 is a flowchart illustrating an example method for operating an electronic device according to various embodiments.

FIG. 5 is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 501. In operation 503, the electronic device 101 may identify an over-temperature state while maintaining the connection to the first RAT. Since the descriptions of operations 501 and 503 have been described above, a detailed description thereof will not be repeated here.

According to various embodiments, in operation 505, the electronic device 101 may determine whether the connection to the first RAT is maintainable. In one example, the electronic device 101, for example, after performing the at least one first operation capable of maintaining the first RAT, may determine that the connection to the first RAT is not maintainable based on identifying that the over-temperature state is still not resolved. As described above, it is assumed that the electronic device 101 has previously performed at least one first operation capable of maintaining the first RAT. After performing the at least one first operation, the electronic device 101 may determine that the connection to the first RAT is not maintainable based on the identification of the over-temperature state and/or the failure to identify the temperature decrease.

In another example, the electronic device 101 may determine whether the connection to the first RAT is maintainable based on the measured temperature. For example, when the measured temperature is included in a first range, the electronic device 101 may determine that the connection to the first RAT is maintainable. For example, when the measured temperature is included in a second range, the electronic device 101 may determine that the connection to the first RAT is not maintainable.

In another example, the electronic device 101 may determine whether the connection to the first RAT is maintainable based on a period in which the over-temperature state is maintained. For example, when the period in which the over-temperature state is maintained is included in a first range, the electronic device 101 may determine that the connection to the first RAT is maintainable. For example, when the period in which the over-temperature state is maintained is included in a second range, the electronic device 101 may determine that the connection to the first RAT is not maintainable.

In another example, the electronic device 101 may determine whether the connection to the first RAT is maintainable based on the strength of the signal from the first RAT. For example, when the strength of the signal from the first RAT is included in a first range, the electronic device 101 may determine that the connection to the first RAT is maintainable. For example, when the strength of the signal from the first RAT is included in a second range, the electronic device 101 may determine that the connection to the first RAT is not maintainable.

According to various embodiments, if it is determined that the connection to the first RAT is maintainable ("yes" in operation 505), the electronic device 101 may perform at least one first operation corresponding to the over-temperature state while maintaining the connection to the first RAT in operation 507. Meanwhile, when the first operation is previously performed before operation 507, the electronic device 101 may perform at least one first operation again in operation 507, or may maintain a state after performance of the first operation. Alternatively, if the over-temperature state is maintained after performing DC deactivation enabling the connection to the first RAT to be maintained, the electronic device 101 may perform another type of first operation, for example, a reduction in the number of antennas. If it is determined that the connection to the first RAT is not maintainable ("no" in operation 505), the electronic device 101 may perform at least one second operation for connection to the second RAT in operation 509.

In various embodiments, the electronic device 101 may establish a connection to the second RAT according to performance of at least one second operation for a connection to the second RAT as in operation 509. After establishing the connection to the second RAT, the electronic device 101 may determine whether the over-temperature state is resolved. If the over-temperature state is resolved, the electronic device 101 may perform at least one operation for connection to the first RAT. If the over-temperature state is not resolved, the electronic device 101 may refrain from performing at least one operation for connection to the first RAT.

As described above, the electronic device 101 maintains the connection to the first RAT, and thus transmission and reception of user data can be performed as seamlessly as possible. However, when heat is intensified, even if transmission and reception of user data is temporarily cut off, the RAT change can be performed to eliminate heat.

Figure 6A:
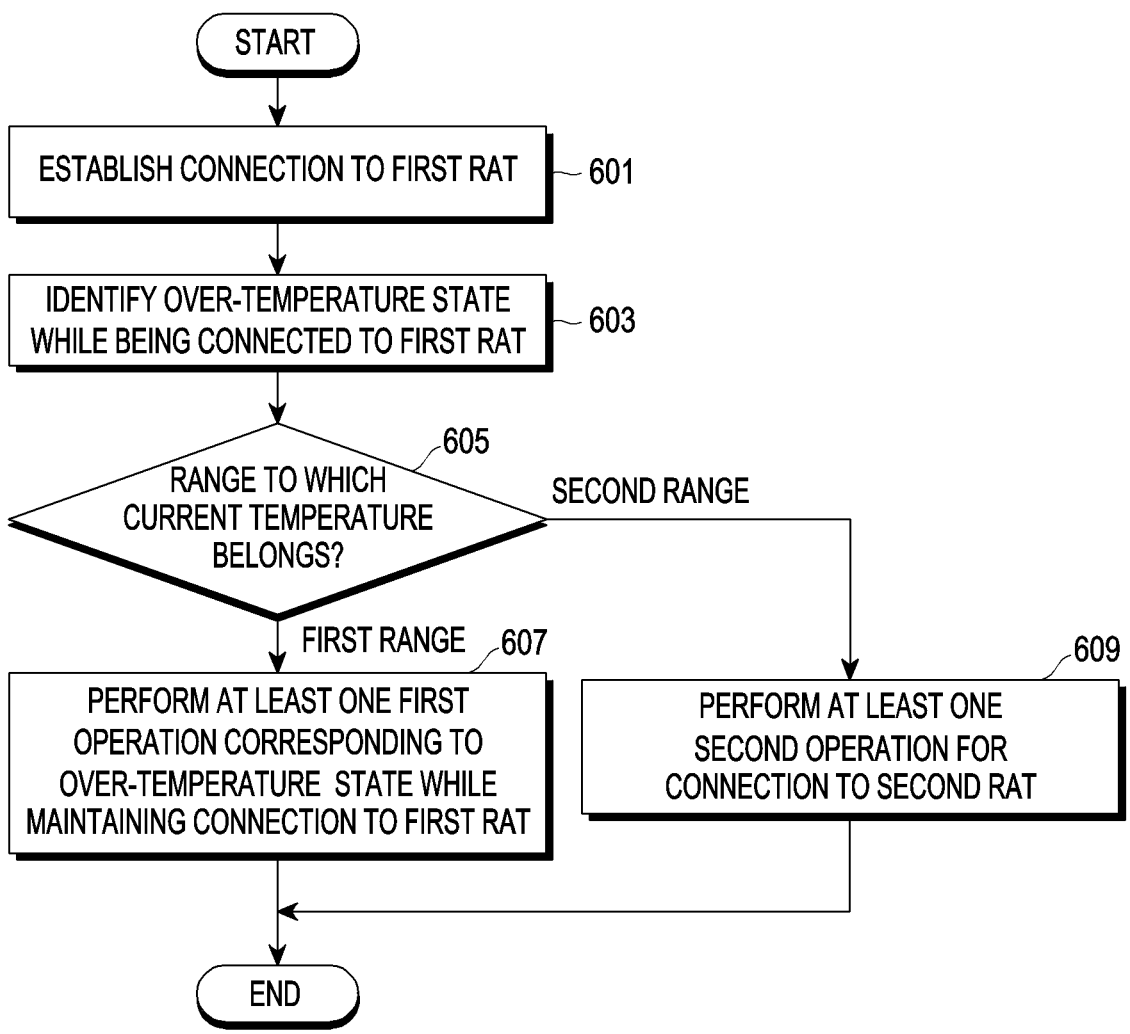
FIG. 6A is a flowchart illustrating an example method for operating an electronic device according to various embodiments.

FIG. 6A is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 601. In operation 603, the electronic device 101 may identify an over-temperature state while being connected to the first RAT. When the over-temperature state is identified, the electronic device 101 may identify a range to which the current temperature belongs in operation 605. If the range to which the current temperature belongs is a first range, the electronic device 101 may perform at least one first operation corresponding to the over-temperature state while maintaining the connection to the first RAT in operation 607. If the range to which the current temperature belongs is a second range, the electronic device 101 may perform at least one second operation for connection to the second RAT in operation 609. Here, the minimum value of the second range may be configured to be greater than the maximum value of the first range, but there is no limitation in this regard. As described above, the electronic device 101 may perform an operation of resolving over-temperature while maintaining a connection to the current RAT in the first range, which is a relatively low temperature range, and thus transmission and reception of user data can be performed as seamlessly as possible. However, in the second range, which is a relatively high temperature range, the RAT can be changed so that heat generation can be eliminated even if the transmission and reception of user data is temporarily cut off thereby preventing the electronic device from overheating. Thus, by preventing the electronic device from overheating, the degradation in the performance of the electronic device is also prevented.

Figure 6B:
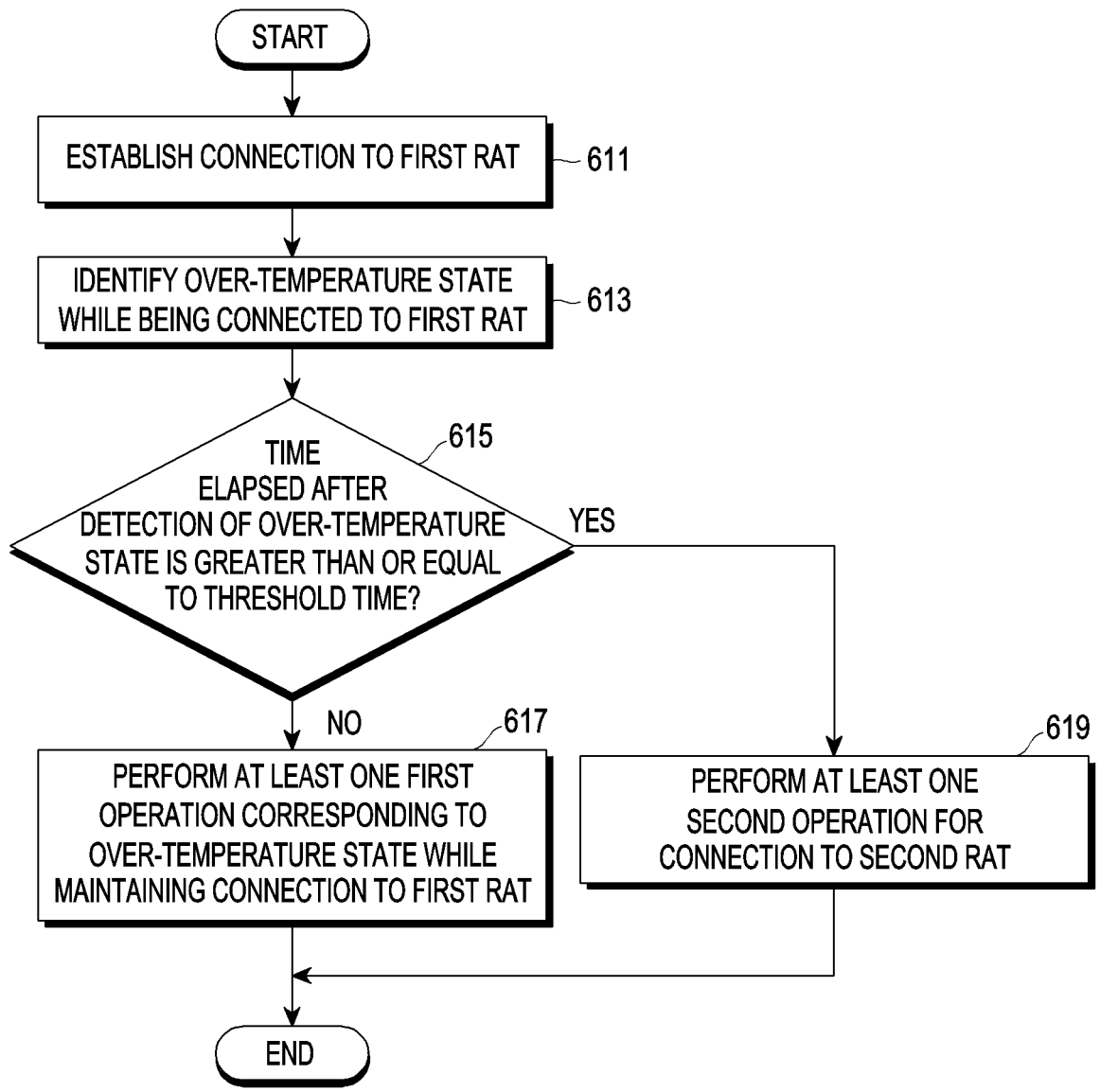
FIG. 6B is a flowchart illustrating an example method for operating an electronic device according to various embodiments.

FIG. 6B is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 611. In operation 613, the electronic device 101 may identify an over-temperature state while being connected to the first RAT. If the over-temperature state is identified, the electronic device 101 may determine whether the time elapsed after a time point at which the over-temperature state is detected is equal to or greater than a threshold time in operation 615. If the elapsed time is less than a threshold time ("no" in operation 615), the electronic device 101 may perform at least one first operation corresponding to the over-temperature state while maintaining the connection to the first RAT in operation 617. If the elapsed time is equal to or greater than the threshold time ("yes" in operation 615), the electronic device 101 may perform at least one second operation for connection to the second RAT in operation 619. In one example, the electronic device 101 may start a timer while performing at least one first operation from a time point at which the over-temperature state is detected. As the timer expires, the electronic device 101 may perform at least one second operation for connection to the second RAT. As described above, at the initial time point when the over-temperature state occurs, the electronic device 101 performs an operation for resolving the over-temperature state while maintaining the connection to the current RAT, and thus transmission and reception of user data can be performed as seamlessly as possible. However, when the over-temperature state is not resolved even after the threshold time has elapsed, the RAT can be changed so that heat generation can be eliminated even if the transmission and reception of user data is temporarily cut off thereby preventing the electronic device from overheating. Thus, by preventing the electronic device from overheating, the degradation in the performance of the electronic device is also prevented.

Figure 6C:
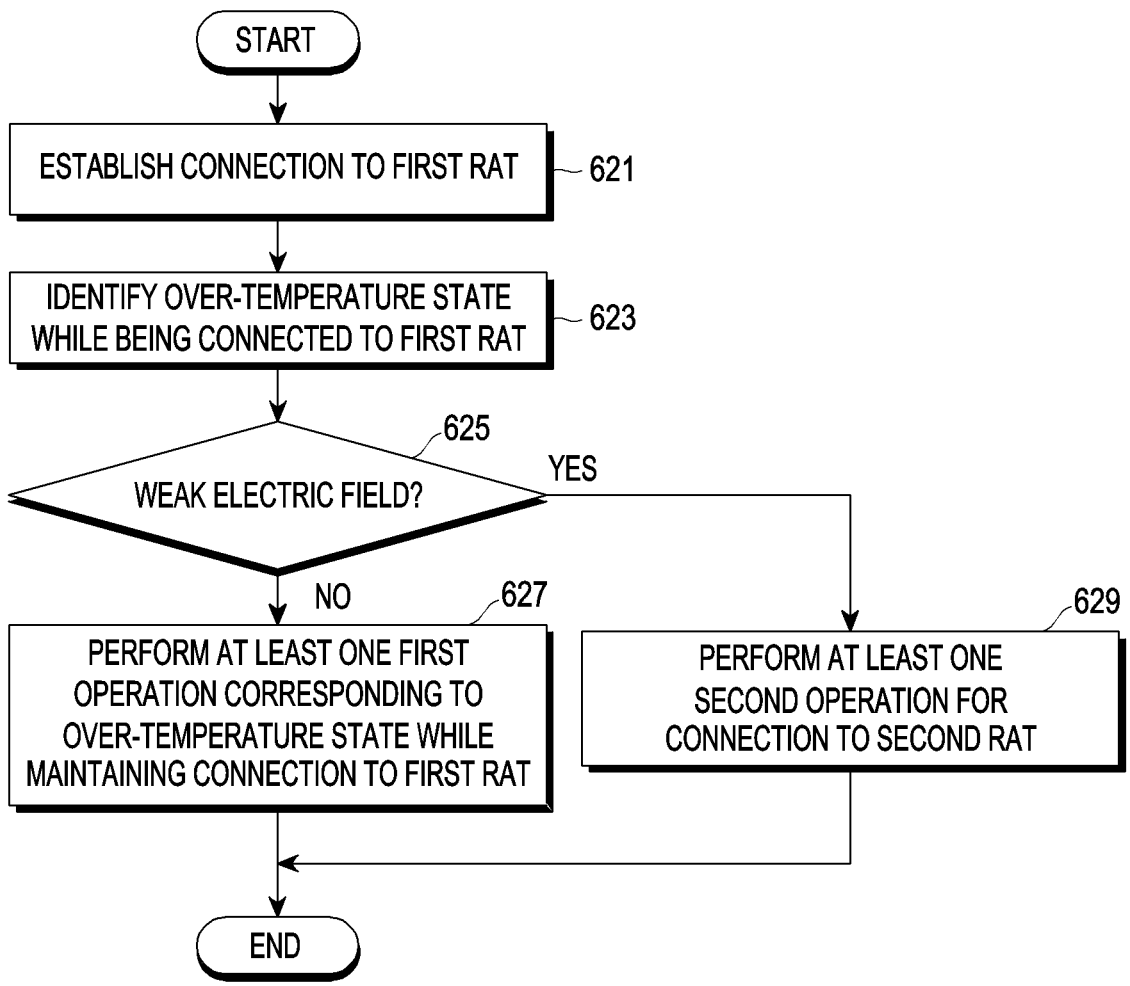
FIG. 6C is a flowchart illustrating an example method for operating an electronic device according to various embodiments.

FIG. 6C is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 621. In operation 623, the electronic device 101 may identify an over-temperature state while being connected to the first RAT. If the over-temperature state is identified, the electronic device 101 may determine whether the first RAT is a weak electric field in operation 625. For example, when the reception strength of the downlink signal from the network of the first RAT is less than or equal to a first threshold magnitude and/or when the transmission strength of the uplink signal is greater than or equal to a second threshold magnitude, the electronic device 101 may determine that the first RAT is a weak electric field. If the first RAT is not determined to be the weak electric field ("no" in operation 625), the electronic device 101 may perform at least one first operation corresponding to the over-temperature state while maintaining the connection to the first RAT in operation 627. If the first RAT is determined to be the weak electric field ("yes" in operation 625), the electronic device 101 may perform at least one second operation for connection to the second RAT in operation 629. As described above, when the RAT is determined not to be the weak electric field, the electronic device 101 may perform an operation of resolving the over-temperature state while maintaining the connection to the current RAT, and thus transmission and reception of user data can be performed as seamlessly as possible. However, when the RAT is determined to be the weak electric field, the RAT change can be performed so as to eliminate heat generation even if the transmission and reception of user data is temporarily cut off. In a case of a weak electric field, it is highly likely that the strength of the uplink signal from the electronic device 101 is configured to have a relatively large magnitude, and thus there is a high possibility that the over-temperature state is not resolved. Accordingly, when the RAT is determined to be the weak electric field, as the electronic device 101 performs the RAT change, the possibility of resolving the over-temperature state may increase.

According to various embodiments, the electronic device 101 may determine whether the electronic device 101 is currently being used. For example, when there is no data displayed on the display module 160, the electronic device 101 may determine that the electronic device 101 is not currently being used. When the electronic device 101 is not currently in use, since there is a low probability that transmission and/or reception of user data according to the RAT change is interrupted, the electronic device 101 may perform the RAT change upon identification of the over-temperature state. Alternatively, the electronic device 101 may determine whether user data is being transmitted and/or received. When user data is not being transmitted and/or received, or when transmission and/or reception of user data is not scheduled, the electronic device 101 may perform RAT change upon identification of the over-temperature state.

Figure 7:
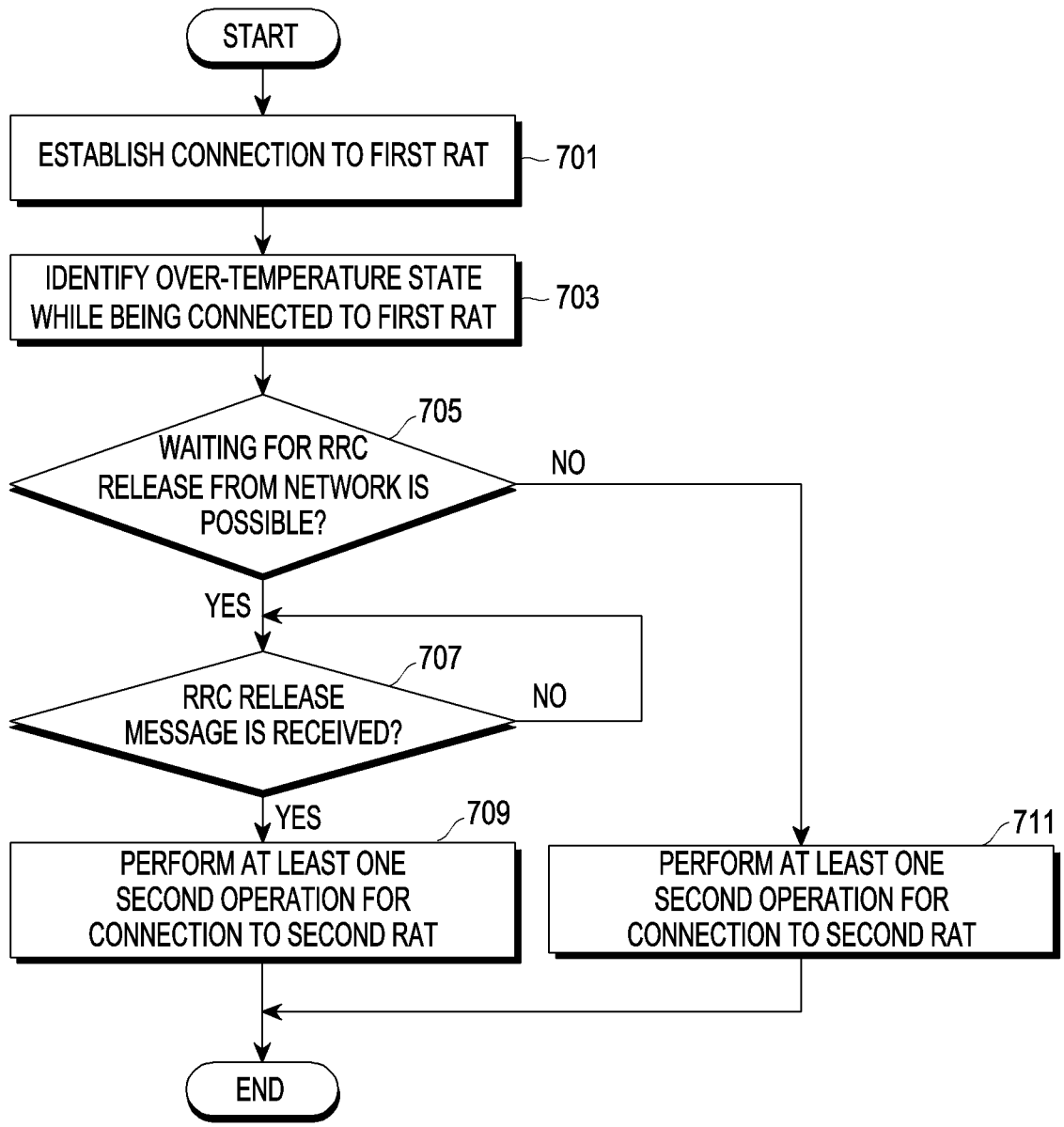
FIG. 7 is a flowchart illustrating an example method for operating an electronic device according to various embodiments.

FIG. 7 is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 701. In operation 703, the electronic device 101 may identify an over-temperature state while being connected to the first RAT.

According to various embodiments, in operation 705, the electronic device 101 may determine whether waiting for an RRC release command from a network is possible. When the RAT is changed according to an RRC release command from the network, more stable communication can be performed than when the electronic device 101 declares a radio link failure (RLF). Accordingly, the electronic device 101 may wait for an RRC release message from the network when the RAT change according to a request from the network is possible. However, when the over-temperature state needs to be resolved quickly, it may be necessary to perform an operation of quickly resolving the over-temperature rather than stable communication. Here, the electronic device 101 may declare an RLF and perform RAT change, rather than waiting for the RRC release command from the network. Various embodiments of determining whether waiting for an RRC release command from a network is possible will be described with reference to FIGS. 8A to 8E. If it is determined that waiting for the RRC release command from the network is possible ("yes" in operation 705), the electronic device 101 may determine whether the RRC release message has been received in operation 707. When the RRC release message is not received ("no" in operation 707), the electronic device 101 may wait for reception of the RRC release message. When the RRC release message is received ("yes" in operation 707), the electronic device 101 may perform at least one operation for connection to the second RAT in operation 709. When the RRC release message from the network is received, the electronic device 101 may perform a cell reselection procedure or perform a scan for the second RAT according to whether system information (e.g., SIB 5) including information for cell reselection has been previously received, and this will be described below. Meanwhile, in various optional embodiments, even when it is determined that waiting for the RRC release command from the network is possible, the electronic device 101 may declare an RLF when the designated timer expires or the over-temperature state is intensified. If it is determined that waiting for the RRC release command from the network is not possible ("no" in operation 705), the electronic device 101 may perform at least one operation for connection to the second RAT in operation 711. The electronic device 101 may, for example, perform a scan for the second RAT, which will be described below.

Meanwhile, as described above with reference to FIG. 4A, the electronic device 101 may perform at least one first operation for resolving the over-temperature state while maintaining the connection to the first RAT, and thereafter, when the over-temperature state is not resolved (or when a condition for performing the second operation is satisfied), the electronic device 101 may perform at least one second operation for connection to the second RAT. When the over-temperature state after performing at least one first operation is not resolved as described above with reference to FIG. 4A, the electronic device 101 may determine whether waiting for an RRC release command from the network is possible as in operation 705. Thereafter, according to a result of the determination, the electronic device 101 may perform an operation of accessing the second RAT according to reception of an RRC release message from the network, or may perform an operation of accessing the second RAT without waiting for the RRC release message.

Meanwhile, as described above with reference to FIG. 5, the electronic device 101 may determine whether a connection to the first RAT is possible when an over-temperature state is identified. When it is determined that the connection to the first RAT is possible, the electronic device 101 may perform at least one first operation of resolving the over-temperature state while maintaining the connection to the first RAT, and when it is determined that the connection to the first RAT is not possible, the electronic device 101 may perform at least one second operation for connection to the second RAT. When it is determined that the connection to the first RAT is not possible as described above with reference to FIG. 5, the electronic device 101 may determine whether waiting for the RRC release command from the network is possible as in operation 705. Thereafter, according to a result of the determination, the electronic device 101 may perform an operation of accessing the second RAT according to reception of an RRC release message from the network, or may perform an operation of accessing the second RAT without waiting for the RRC release message.

FIG. 8A to FIG. 8E describe flowcharts illustrating a method for operating an electronic device according to various optional embodiments for determining whether waiting for an RRC release command from a network is possible.

Figure 8A:
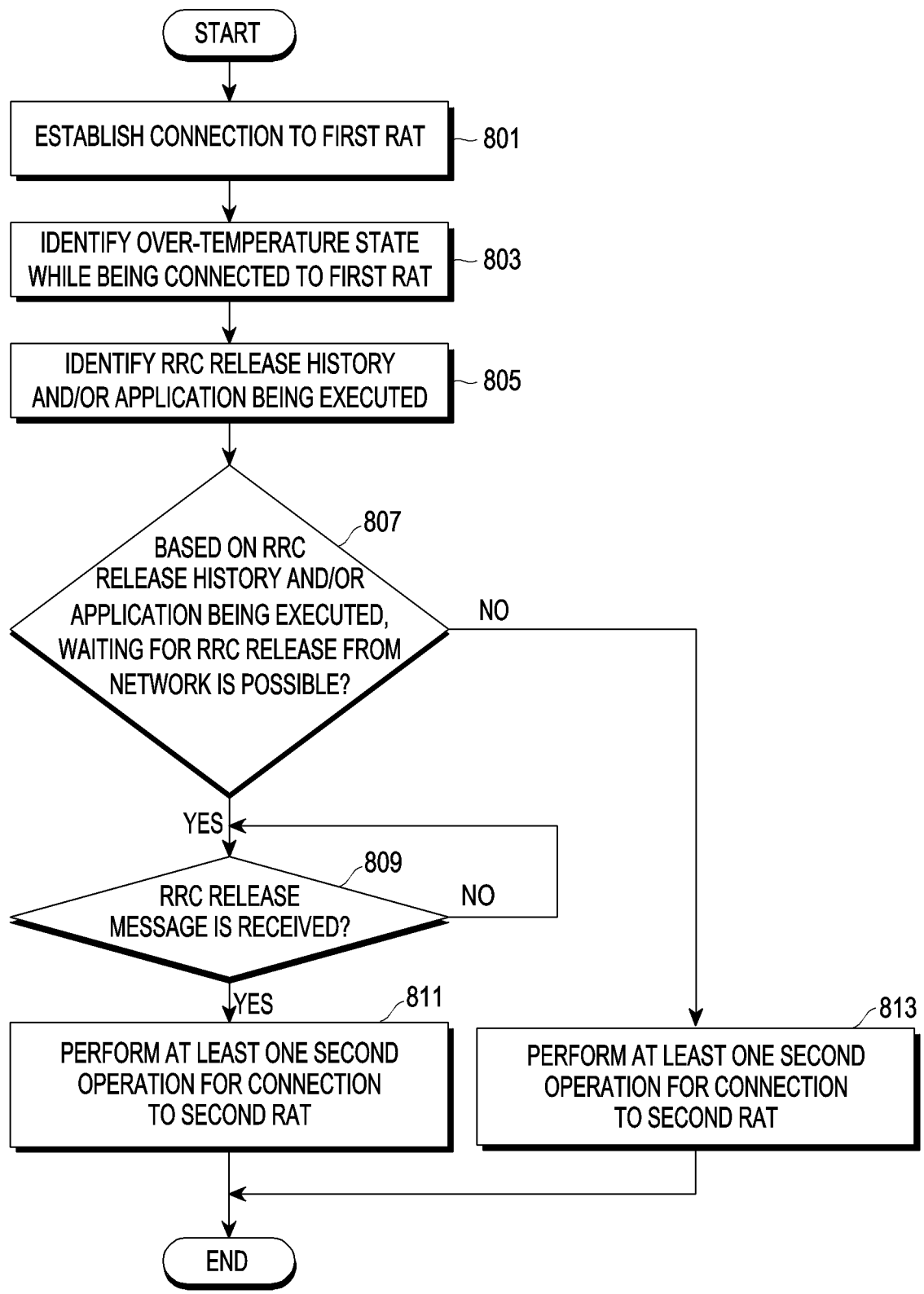
FIG. 8A is a flowchart illustrating an example method for operating an electronic device according to various embodiments.

FIG. 8A is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 801. In operation 803, the electronic device 101 may identify an over-temperature state while being connected to the first RAT.

According to various embodiments, in operation 805, the electronic device 101 may identify an RRC release history and/or an application being executed. In operation 807, the electronic device 101 may determine whether waiting for an RRC release command from the network is possible, based on the RRC release history and/or the application being executed. In one example, the electronic device 101 may store and/or manage the reception history of RRC release messages from the network. The electronic device 101 may predict a period from the current time point until additional RRC release messages are expected to be received, based on, for example, an interval between reception times of the RRC release messages. The electronic device 101 may determine that waiting for an RRC release command from the network is possible when the expected period is less than or equal to a threshold period. Alternatively, the electronic device 101 may determine whether waiting for an RRC release command from the network is possible based on the application currently being executed. For example, when the first type of application for real-time streaming is being executed, the RRC release message may not be received for a relatively long period of time. When the first type of application is being executed, the electronic device 101 may determine that waiting for the RRC release command from the network is not possible. Alternatively, if a video providing application of a second type (which is not real-time video) is being executed, a file for viewing a predetermined amount of video is downloaded, and thereafter there may be no traffic for a predetermined period of time, during which an RRC release message may be received. When the second type of application is being executed, the electronic device 101 may determine that waiting for an RRC release command from the network is possible.

According to various embodiments, if it is determined that waiting for the RRC release command from the network is possible ("yes" in operation 807), the electronic device 101 may determine whether an RRC release message is received from the network in operation 809. When the RRC release message is not received ("no" in operation 809), the electronic device 101 may wait for reception of the RRC release message. When the RRC release message is received ("yes" in operation 809), the electronic device 101 may perform at least one operation for connection to the second RAT in operation 811. Thus, the electronic device advantageously performs a more stable communication since the electronic device does not declares RLF. Further if it is determined that waiting for the RRC release command from the network is not possible ("no" in operation 807), the electronic device 101 may perform at least one operation for connection to the second RAT in operation 813.

Figure 8B:
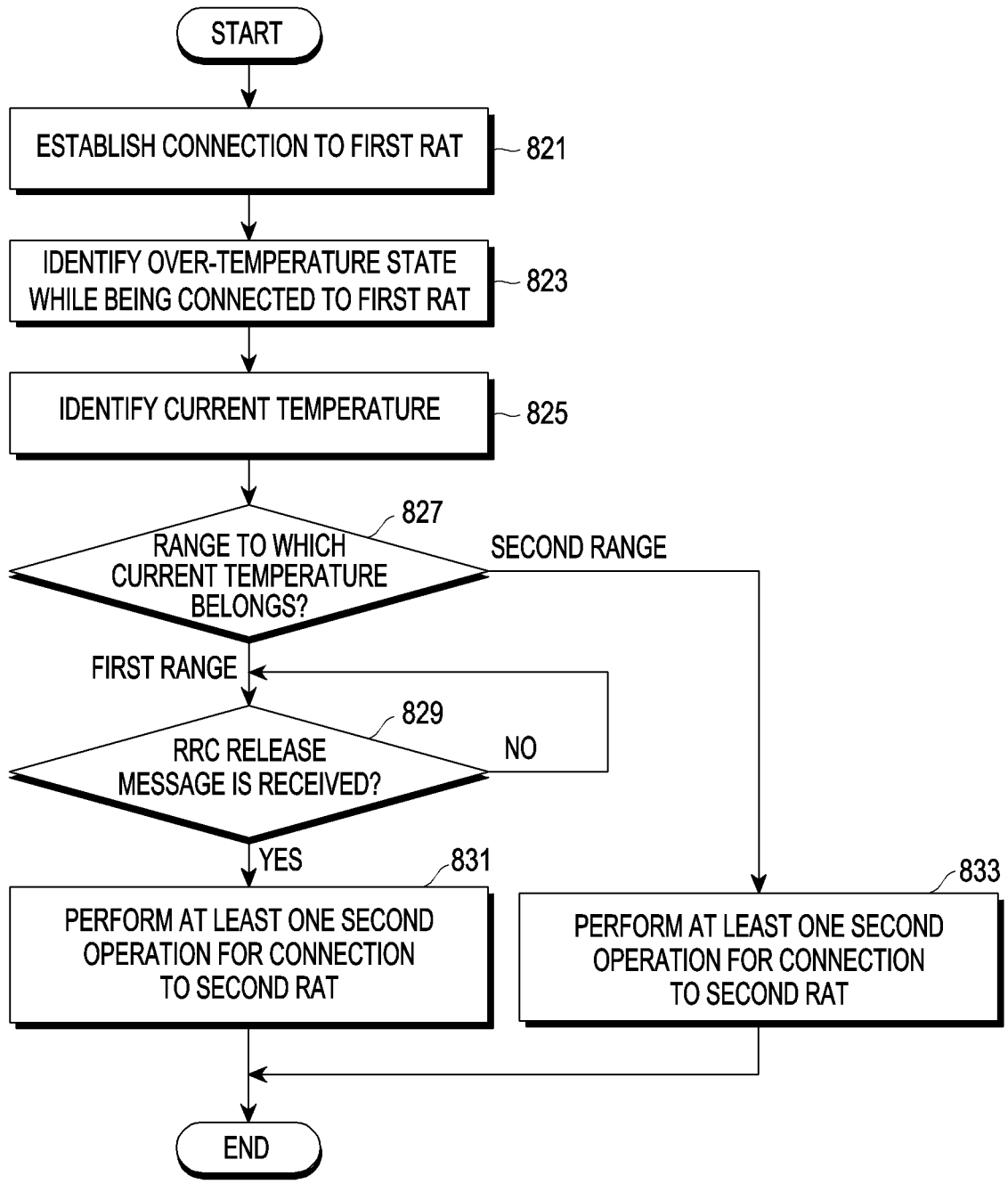
FIG. 8B is a flowchart illustrating an example method for operating an electronic device according to various embodiments.

FIG. 8B is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 821. In operation 823, the electronic device 101 may identify an over-temperature state while being connected to the first RAT.

According to various embodiments, the electronic device 101 may identify the current temperature in operation 825. In operation 827, the electronic device 101 may determine whether waiting for an RRC release command from the network is possible, based on a range to which the current temperature belongs. When the identified temperature is within a first range, the electronic device 101 may determine whether an RRC release message is received from the network in operation 829. When the RRC release message is not received ("no" in operation 829), the electronic device 101 may wait for reception of the RRC release message. When the RRC release message is received ("yes" in operation 829), the electronic device 101 may perform at least one operation for connection to the second RAT in operation 831. When the identified temperature is in a second range in operation 827, the electronic device 101 may perform at least one operation for connection to the second RAT in operation 833. Here, the minimum value of the second range may be configured to be greater than the maximum value of the first range, but there is no limitation in this regard.

Figure 8C:
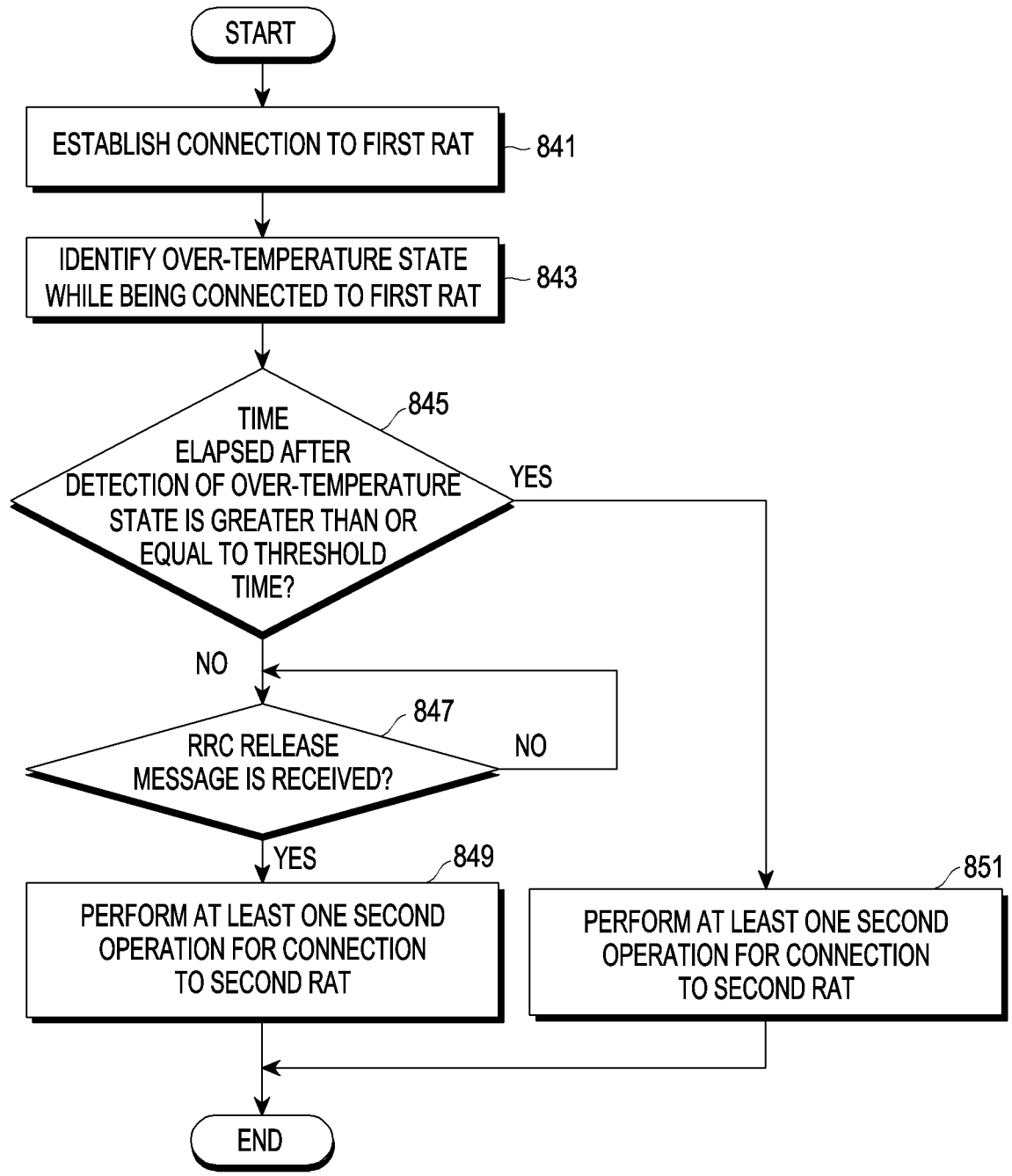
FIG. 8C is a flowchart illustrating an example method for operating an electronic device according to various embodiments.

FIG. 8C is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 841. In operation 843, the electronic device 101 may identify an over-temperature state while being connected to the first RAT.

According to various embodiments, in operation 845, the electronic device 101 may determine whether the time elapsed after a time point at which the over-temperature state is detected is equal to or greater than a threshold time. When the elapsed time after the detection of the over-temperature state is less than the threshold time ("no" in operation 845), the electronic device 101 may determine whether an RRC release message is received from the network in operation 847. When the RRC release message is not received ("no" in operation 847), the electronic device 101 may wait for reception of the RRC release message. When the RRC release message is received ("yes" in operation 847), the electronic device 101 may perform at least one operation for connection to the second RAT in operation 849. When the elapsed time after the detection of the over-temperature state is equal to or greater than the threshold time ("yes" in operation 845), the electronic device 101 may perform at least one operation for connection to the second RAT in operation 851.

In one example, the electronic device 101 may be implemented to sequentially perform the first operation and the second operation using two timers. For example, when an initial over-temperature state is detected, the electronic device 101 may not perform a particular operation before the first period expires. When the first period expires, the electronic device 101 may perform at least one first operation while maintaining the connection to the first RAT. From the time point at which the over-temperature state is detected, if the second period configured to be longer than the first period expires, the electronic device 101 may perform at least one second operation for changing the RAT.

Figure 8D:
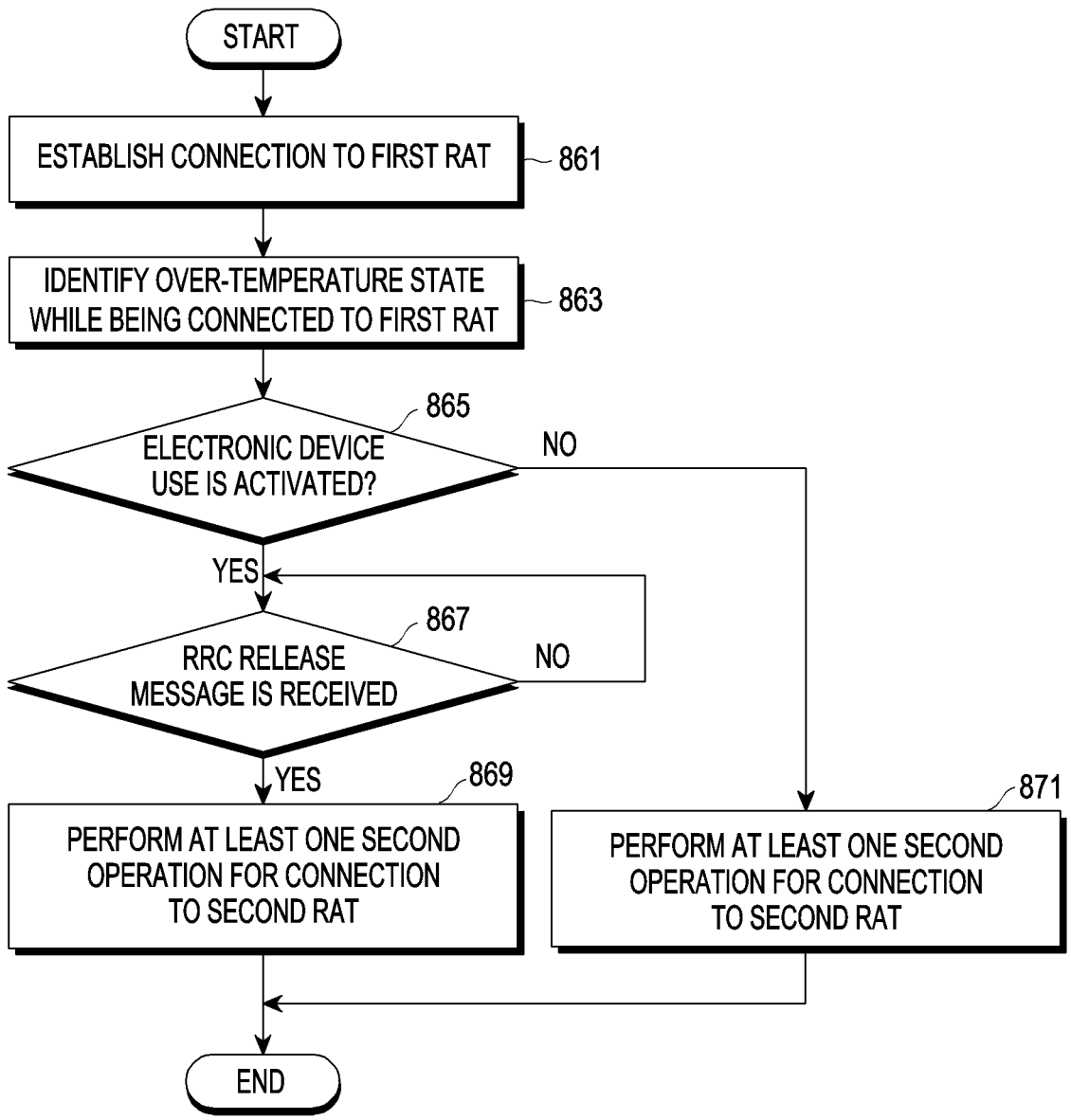
FIG. 8D is a flowchart illustrating an example method for operating an electronic device according to various embodiments.

FIG. 8D is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 861. In operation 863, the electronic device 101 may identify an over-temperature state while being connected to the first RAT.

According to various embodiments, in operation 865, the electronic device 101 may determine whether the use of the electronic device 101 is activated. For example, when there is no data displayed on the display module 160 (or when the display module 160 is turned off), the electronic device 101 may determine that the electronic device 101 is not currently in use. Alternatively, the electronic device 101 may determine whether the use thereof is activated, based on whether user data is being transmitted and/or received. When user data is not being transmitted and/or received or when transmission and/or reception of user data is not scheduled, the electronic device 101 may determine that the use thereof is not activated. When it is determined that the electronic device use is activated ("yes" in operation 865), the electronic device 101 may determine whether an RRC release message is received from the network in operation 867. When the RRC release message is not received ("no" in operation 867), the electronic device 101 may wait for reception of the RRC release message. When the RRC release message is received ("yes" in operation 867), the electronic device 101 may perform at least one operation for connection to the second RAT in operation 869. When the electronic device use is not activated ("no" in operation 865), the electronic device 101 may perform at least one operation for connection to the second RAT in operation 871.

Figure 8E:
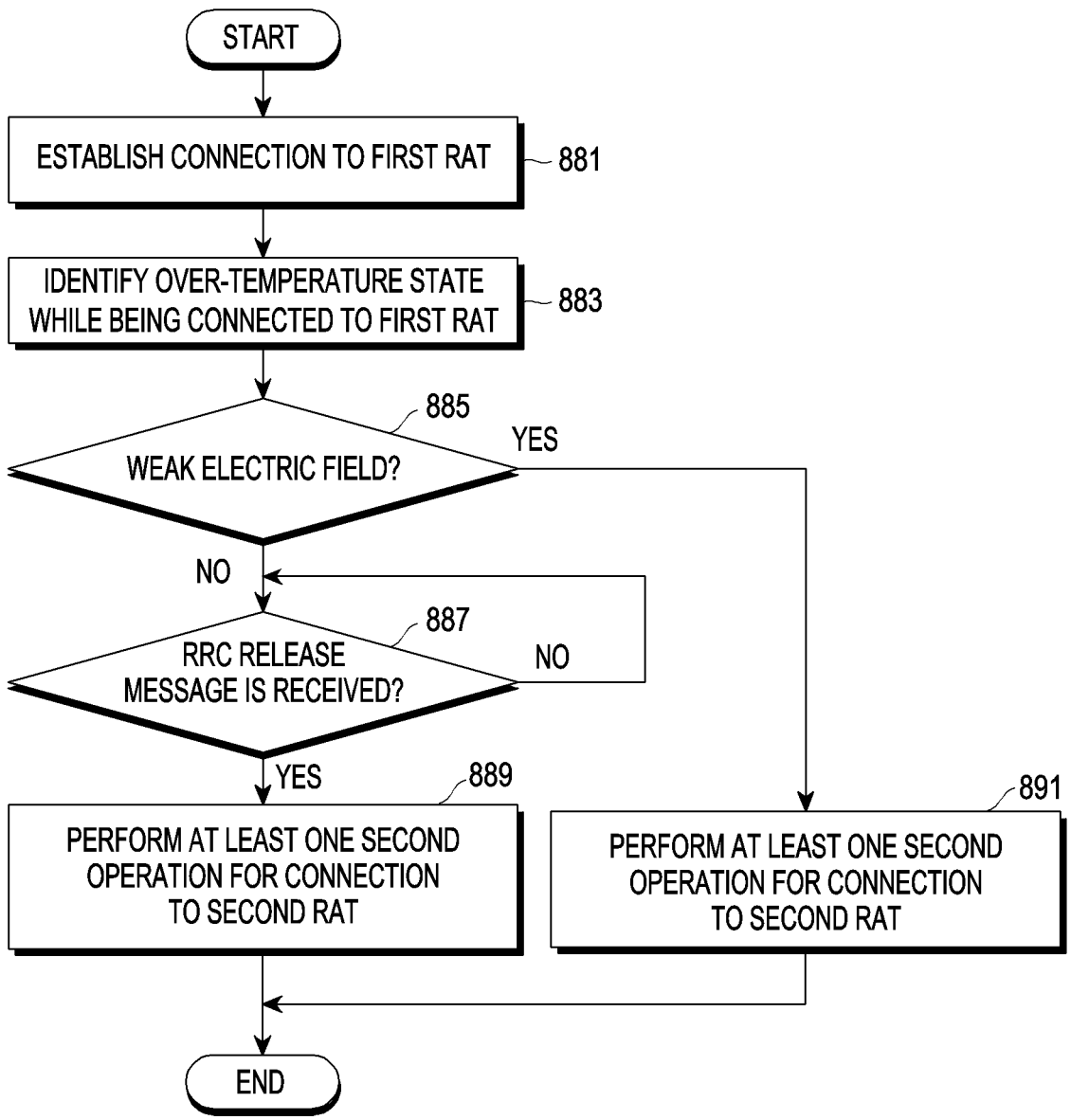
FIG. 8E is a flowchart illustrating an example method for operating an electronic device according to various embodiments.

FIG. 8E is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 881. In operation 883, the electronic device 101 may identify an over-temperature state while being connected to the first RAT.

According to various embodiments, the electronic device 101 may determine whether the electronic device 101 is in a weak electric field in operation 885. For example, when the reception strength of a downlink signal from a network of a first RAT is less than or equal to a first threshold and/or when the transmission strength of an uplink signal is greater than or equal to a second threshold, the electronic device 101 may determine that the first RAT is a weak electric field. When the first RAT is determined not to be a weak electric field ("no" in operation 885), the electronic device 101 may determine whether an RRC release message is received from the network in operation 887. When the RRC release message is not received ("no" in operation 887), the electronic device 101 may wait for reception of the RRC release message. When the RRC release message is received ("yes" in operation 887), the electronic device 101 may perform at least one operation for connection to the second RAT in operation 889. When the first RAT is determined to be a weak electric field ("yes" in operation 885), the electronic device 101 may perform at least one operation for connection to the second RAT in operation 891.

Figure 9:
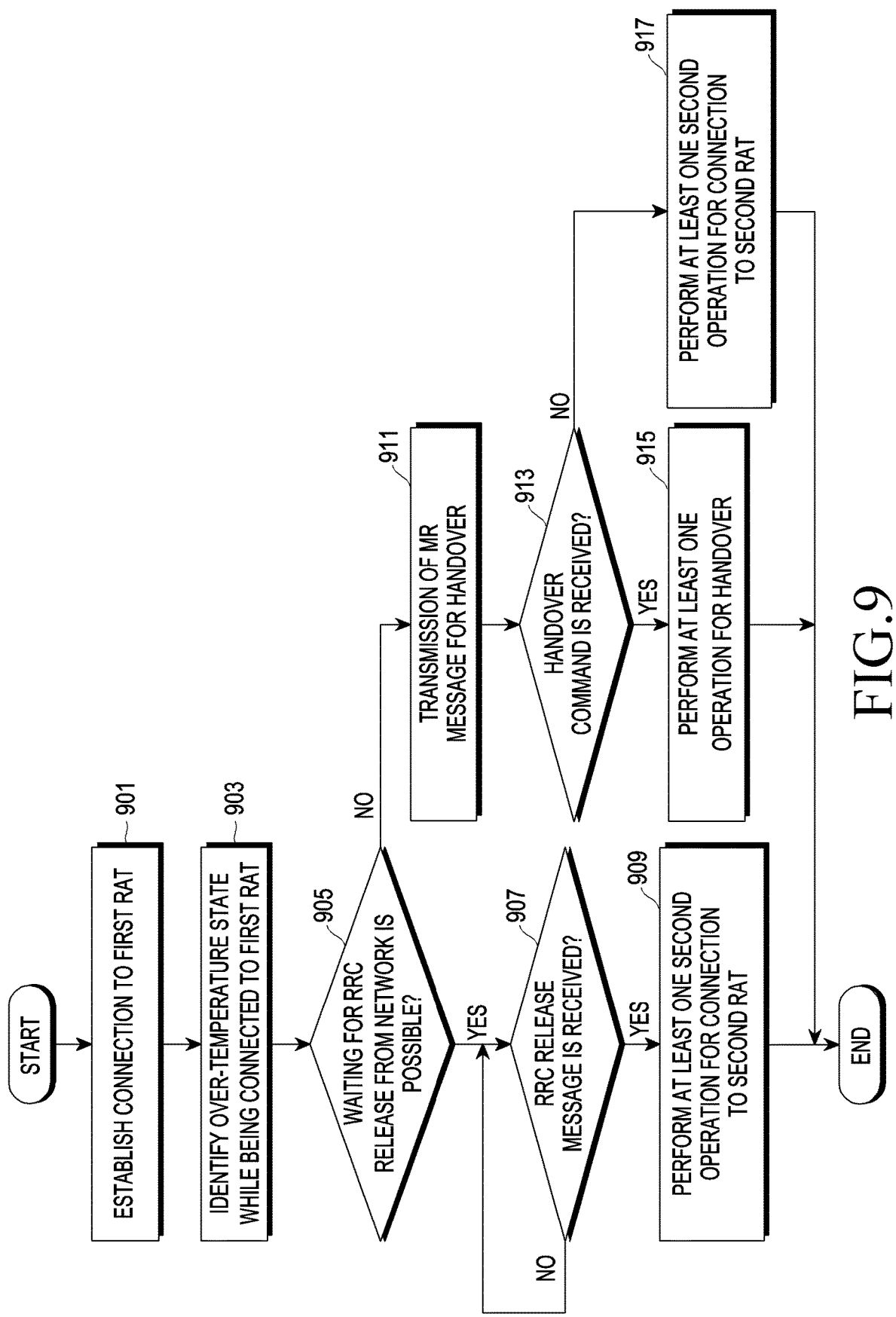
FIG. 9 is a flowchart illustrating an example method for operating an electronic device according to various embodiments.

FIG. 9 is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 901. In operation 903, the electronic device 101 may identify an over-temperature state while being connected to the first RAT. In operation 905, the electronic device 101 may determine whether waiting for an RRC release command from a network is possible. Various embodiments of determining whether waiting for the RRC release command from the network is possible have been described with reference to FIGS. 8A to 8E, and thus detailed description thereof will not be repeated here. If it is determined that waiting for the RRC release command from the network is possible ("yes" in operation 905), the electronic device 101 may determine whether an RRC release message is received in operation 907. When the RRC release message is not received ("no" in operation 907), the electronic device 101 may wait for reception of the RRC release message. When the RRC release message is received ("yes" in operation 907), the electronic device 101 may perform at least one operation for connection to the second RAT in operation 909.

According to various embodiments, if it is determined that waiting for the RRC release command from the network is not possible ("no" in operation 905), the electronic device 101 may transmit an MR (Measurement Report) message for handover to the network in operation 911. Although not shown, the electronic device 101 may identify a measurement configuration (measconfig) based on at least one RRC reconfiguration message from the network (e.g., an RRC reconfiguration message of 3GPP TS 38.331, or an RRC connection reconfiguration message of 3GPP TS 36.331). The measurement configuration may include at least one of at least one measurement object (e.g., frequency), a report configuration corresponding to the measurement object, and report identification information (measID) capable of identifying a correspondence relationship between the measurement object and the report configuration. For example, the electronic device 101 may identify information relating to A2 event, information relating to B1 event, or information relating to B2 event in the report configuration. When the measurement result of the measurement object satisfies at least one of the A2 event, the B1 event, or the B2 event, the electronic device 101 may transmit a measurement report message to the network. Meanwhile, if it is determined that waiting for the RRC release command from the network is not possible, the electronic device 101 may transmit, even if the reporting condition of at least one of the A2 event, the B1 event, or the B2 event is not satisfied, a measurement report message corresponding to at least one of the A2 event, the B1 event, or the B2 event to the network in operation 911, and the transmission may be performed for the purpose of deriving a handover command from the network. The network may be likely to transmit a handover command to the electronic device 101 based on the reception of the measurement report message from the electronic device 101. For example, in response to the measurement report message of the A2 event, the network may be likely to provide, to the electronic device 101, a handover command to a target cell of the second RAT. Alternatively, the network may be likely to provide the electronic device 101 with an RRC reconfiguration message of a measurement configuration such as B1 event or B2 event. Here, when the measurement result of the inter-RAT measurement object satisfies the B1 event or the B2 event, the electronic device 101 may transmit a measurement report message corresponding to the B1 event or B2 event to the network. Alternatively, the electronic device 101 may transmit a measurement report message corresponding to the B1 event or the B2 event to the network even though the reporting condition is not satisfied. Based on the reception of the measurement report message from the electronic device 101, the network may be likely to transmit, to the electronic device 101, a handover command to the target cell of the second RAT. As described above, when it is determined that waiting for the RRC release command from the network is not possible, the electronic device 101 may be configured to transmit the measurement report message, even if the reporting condition is not satisfied, so as to derive the inter-RAT handover command.

According to various optional embodiments, in operation 913, the electronic device 101 may determine whether a handover command has been received. As described above, the electronic device 101 may transmit a measurement report message for deriving inter-RAT handover even when the reporting condition is not satisfied, and accordingly, the network may be likely to transmit a handover command corresponding to the measurement report message to the electronic device 101. When the handover command is received ("yes" in operation 913), the electronic device 101 may perform at least one operation for handover in operation 915. For example, the electronic device 101 may perform at least one operation, which is for an RA procedure to the target cell and is included in the handover command, but there is no limitation in this regard. When the handover command is not received ("no" in operation 913), the electronic device 101 may, for example, declare an RLF and perform at least one operation for connection to the second RAT in operation 917. In one example, the electronic device 101 may be configured to perform operation 917 as a designated period expires after transmission of the measurement report message, but there is no limitation in this regard. As described above, even when it is determined that waiting for the RRC release command from the network is not possible, the electronic device 101 may be implemented to first perform an operation of deriving the inter-RAT handover command from the network, and then declare the RLF when the inter-RAT handover is not performed. Accordingly, even when it is determined that waiting for the RRC release command is not possible, handover, which is the second best scheme in which synchronization between the network and the electronic device is maintained as much as possible, may be attempted.

Figure 10A:
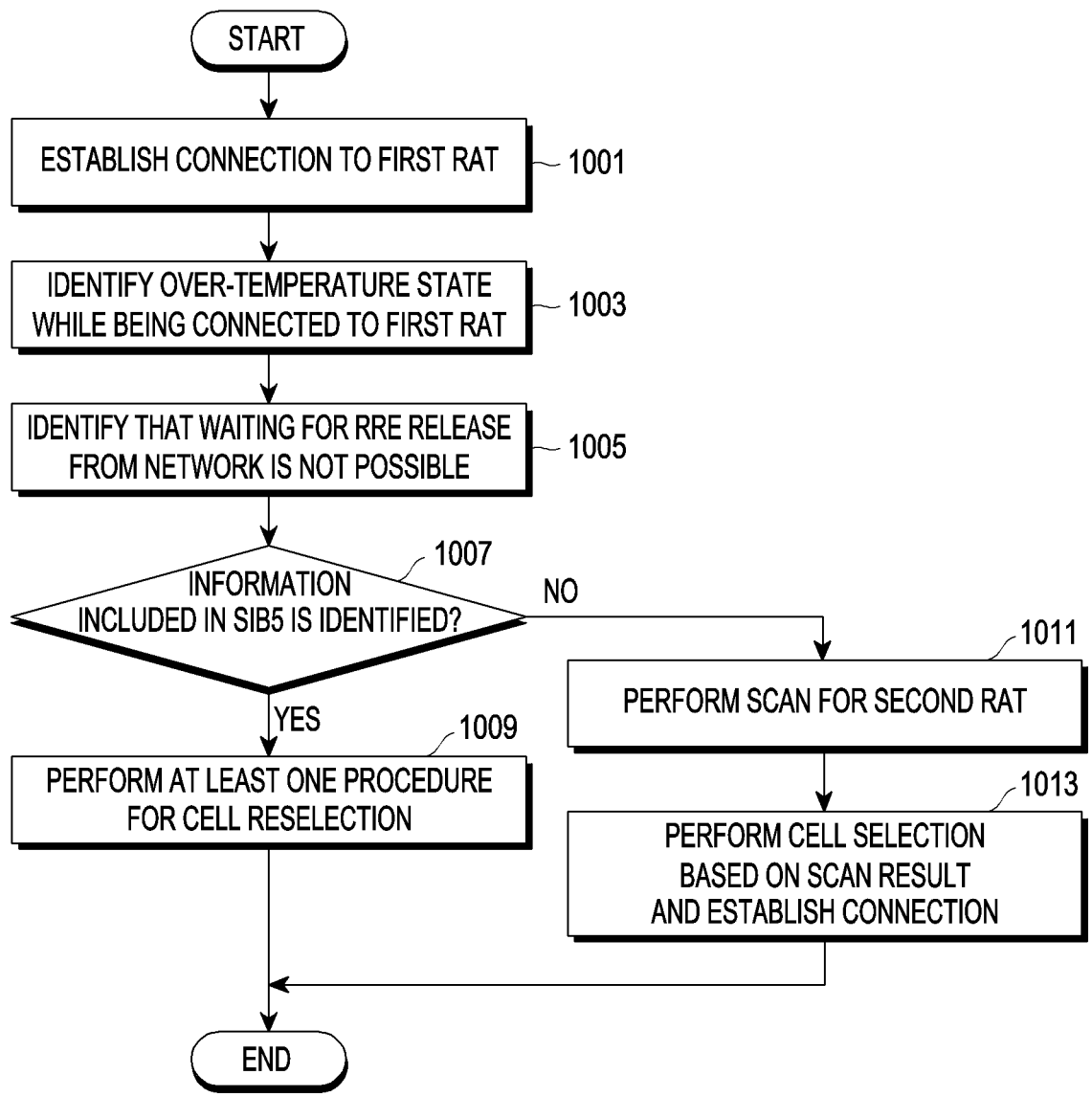
FIG. 10A is a flowchart illustrating an example method for operating an electronic device according to various embodiments.

FIG. 10A is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 1001. In operation 1003, the electronic device 101 may identify an over-temperature state while being connected to the first RAT. In operation 1005, the electronic device 101 may identify that waiting for the RRC release command from the network is possible. Since the criterion for determining whether waiting for the RRC release command from the network is possible has been described above, a detailed description thereof will not be repeated here.

According to various embodiments, the electronic device 101 may determine whether information included in SIB5 is identified in operation 1007. In one example, the electronic device 101 may have received SIB5 from the network or may not have received SIB5 from the network. When information included in SIB5 is identified ("yes" in operation 1007), the electronic device 101 may declare an RLF and perform at least one procedure for cell reselection in operation 1009. Table 1 is an example of SIB5.

TABLE 1

Value SIB5 ::=
{
　　carrierFreqListEUTRA
　　{
　　　　{
　　　　　　carrierFreq 1550
　　　　　　allowedMeasBandwidth mbw100
　　　　　　presenceAntennaPort1 TRUE
　　　　　　cellReselectionPriority 5
　　　　　　thresh-High 4,
　　　　　　thresh-Low 4,
　　　　　　q-RxLevMin −64
　　　　　　q-QualMin −34
　　　　　　p-MaxEUTRA 23
　　　　}
　　　　{
　　　　　　carrierFreq 3743
　　　　　　allowedMeasBandwidth mbw50
　　　　　　presenceAntennaPort1 TRUE
　　　　　　cellReselectionPriority 5
　　　　　　thresh-High 4,
　　　　　　thresh-Low 4,
　　　　　　q-RxLevMin −64
　　　　　　q-QualMin −34
　　　　　　p-MaxEUTRA 23
　　　　}
　　　　{
　　　　　　carrierFreq 450
　　　　　　allowedMeasBandwidth mbw50
　　　　　　presenceAntennaPort1 TRUE
　　　　　　cellReselectionPriority 5
　　　　　　thresh-High 4,
　　　　　　thresh-Low 4,
　　　　　　q-RxLevMin −64
　　　　　　q-QualMin −34
　　　　　　p-MaxEUTRA 23
　　　　}

Table 1 may include frequency information for neighboring cells of a serving cell (e.g., ARFCN: 1550, 3743, and 450), a bandwidth (mbw: 100 and 50), a cell reselection priority: 5, threshX-High: 4, threshX-Low: 4, q-RxLevMin: −54, q-QualMin: −34, and p-maxEUTRA 23, but the values are examples only. The electronic device 101 may perform a scan based on frequency information (e.g., ARFCN) included in SIB5, and may determine whether a scan result satisfies cell reselection criteria. Cell reselection may be identified based on information included in SIB5 (e.g., at least one of threshX-High, threshX-Low, q-RxLevMin, q-QualMin, or p-maxEUTRA). In one example, the electronic device 101 may determine whether the scan result satisfies the adjusted cell reselection condition, and may select a cell that satisfies the adjusted cell reselection condition. The adjusted cell reselection condition will be described with reference to FIG. 10B. The electronic device 101 may camp on the selected cell and establish an RRC connection, and thus a connection to the second RAT may be established. According to various embodiments, when the information included in SIB5 is not identified ("no" in operation 1007), the electronic device 101 may perform a scan for the second RAT in operation 1011. In operation 1013, the electronic device 101 may perform cell selection based on the scan result, and may establish an RRC connection to the camped-on cell, and thus a connection to the second RAT may be established.

Figure 10B:
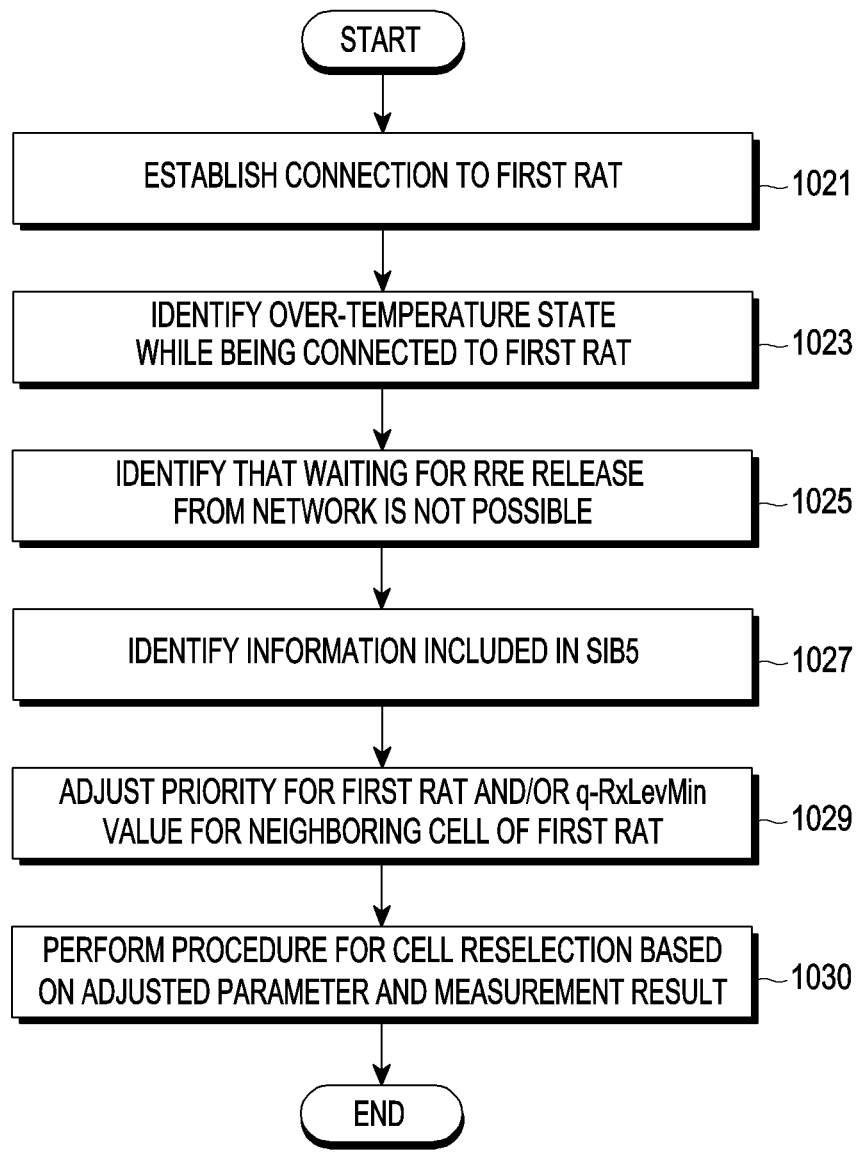
FIG. 10B is a flowchart illustrating an example method for operating an electronic device according to various embodiments.

FIG. 10B is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 1021. In operation 1023, the electronic device 101 may identify an over-temperature state while being connected to the first RAT. In operation 1025, the electronic device 101 may determine that waiting for an RRC release command from the network is possible. In the present embodiment, it is assumed that the electronic device 101 has received SIB5, and the electronic device may identify information included in SIB5 in operation 1027.

According to various embodiments, in operation 1029, the electronic device 101 may adjust a priority for the first RAT and/or q-RxLevMin value for a neighboring cell of the first RAT. In operation 1031, the electronic device 101 may perform a procedure for cell reselection based on the adjusted parameter and the measurement result. For example, the electronic device 101 may configure the priority for the first RAT to be lower than the priority for the second RAT, and thus it is highly likely that cell reselection to a neighboring cell for the second RAT is to be performed. For example, the electronic device 101 may configure the q-RxLevMin value for the neighboring cell of the first RAT to be a value greater than a value configured by the network. The electronic device 101 may maintain the q-RxLevMin value for the neighboring cell of the second RAT as a value configured by the network. Since the q-RxLevMin value of the neighboring cell of the first RAT is configured to be a relatively large value, the Srxlev value corresponding to the cell of the first RAT may have a relatively small value, and accordingly, the possibility of cell reselection for the cell of the first RAT may be reduced and the possibility of cell reselection for the cell of the second RAT may be increased. Alternatively, the electronic device 101 may configure the Qqualmin value for the neighboring cell of the first RAT to be a value greater than a value configured by the network. The electronic device 101 may maintain the Qqualmin value for the neighboring cell of the second RAT as a value configured by the network. Since the Qqualmin value of the neighboring cell of the first RAT is configured to be a relatively large value, the Sqaul value corresponding to the cell of the first RAT may have a relatively small value, and accordingly, the possibility of cell reselection for the cell of the first RAT may be reduced and the possibility of cell reselection for the cell of the second RAT may be increased. According to various embodiments, the electronic device 101 may configure the q-RxLevMin value and/or a Qqualmin value for a neighboring cell of the second RAT to be a value smaller than a value configured by the network. As the q-RxLevMin value and/or the Qqualmin value is configured to be a value smaller than the value configured by the network, the Srxlev value and/or the Sqaul value for the neighboring cells of the second RAT may have a relatively large value, and thus the possibility of cell reselection for the cell of the second RAT may be increased. According to various embodiments, the electronic device 101 may adjust the cell reselection priority of the neighboring cell of the second RAT to be higher than the cell reselection priority of the neighboring cell of the first RAT, and the possibility of cell reselection for the cell of the second RAT may be increased.

Figure 11:
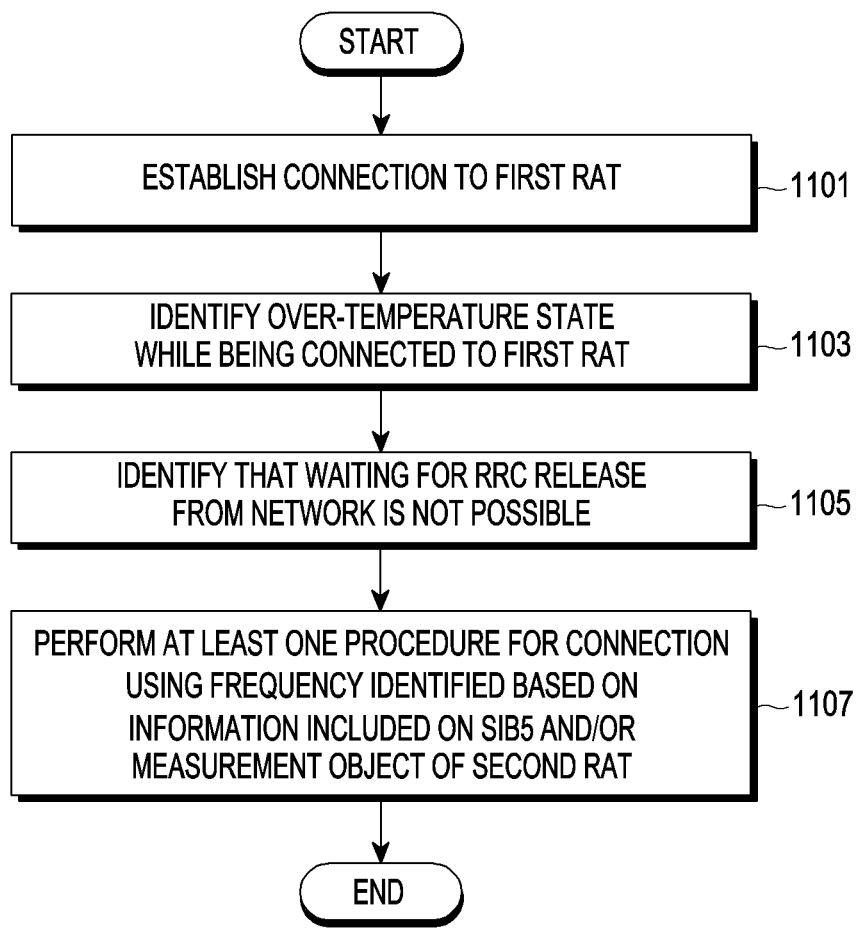
FIG. 11 is a flowchart illustrating an example method for operating an electronic device according to various embodiments.

FIG. 11 is a flowchart illustrating an example method for operating an electronic device according to various embodiments.

According to various embodiments, the electronic device 101 (e.g., at least one of the processor 120, the first communication processor 212, the second communication processor 214, or the integrated communication processor 260) may establish a connection to the first RAT in operation 1101. In operation 1103, the electronic device 101 may identify an over-temperature state while being connected to the first RAT. In operation 1105, the electronic device 101 may determine that waiting for the RRC release command from the network is not possible. Since the determination as to whether waiting for the RRC release command is possible has been described above, a detailed description thereof will not be repeated here. The electronic device 101 may declare the RLF, and may perform at least one procedure for connection using a frequency identified based on information included in SIB5 and/or a measurement object of the second RAT in operation 1107. For example, when the electronic device 101 receives the SIB5 shown in Table 1, the electronic device 101 may scan a frequency (e.g., ARFCN) included in the SIB5. For example, the electronic device 101 may receive information relating to the report configuration (measConfig) from the network, and may identify a measurement object (e.g., frequency) included in the report configuration. The electronic device 101 may scan the frequency of the measurement object. The electronic device 101 may select a cell based on the scan result and establish a connection to the camped-on cell, and accordingly, a connection to the second RAT may be established. For example, the electronic device 101 may store SIB5 information and/or a measurement object (or a measurement result) at a time point before or after the detection of the over-temperature state. Based on the measurement result, the electronic device 101 may select a frequency for preferentially performing a scan. If the SIB5 and/or the measurement object are not identified, the electronic device 101 may perform a general scan (e.g., a scan based on stored information and/or a scan for all frequencies supported by the electronic device 101). At least one procedure for connection to the second RAT according to FIG. 11 may be referred to as forced redirection. Alternatively, when it is determined that waiting for the RRC release command is impossible, the electronic device 101 may declare an RLF and perform a procedure for cell reselection.

According to various embodiments, the electronic device 101 may include at least one processor (e.g., at least one of the processor 120, the first communication processor 212, the second communication processor 214, or the integrated communication processor 260), wherein the at least one processor is configured to identify an over-temperature state in a state of being connected to the first RAT; based on the identification of the over-temperature state, identify whether a connection to the first RAT is maintainable; based on identifying that the connection to the first RAT is maintainable, perform at least one first operation corresponding to the over-temperature state while maintaining the connection to the first RAT; and based on identifying that the connection to the first RAT is not maintainable, perform at least one second operation for establishing a connection to a second RAT different from the first RAT. Advantageously, the electronic device maintains the connection for the first RAT based on identifying that the connection for the first RAT is maintainable, and thus the transmission and reception of user data is performed as seamlessly as possible. However, when the heat is intensified, even if the transmission and reception of user data is temporarily cut off, the RAT change is performed, for establishing a connection for the second RAT based on identifying that the connection for the first RAT is not maintainable, so as to eliminate heat thereby preventing the electronic device from overheating. Thus, by preventing the electronic device from overheating, the degradation in the performance of the electronic device is also prevented.

According to various embodiments, the at least one processor may be configured to, as at least part of an operation of identifying whether the connection to the first RAT is maintainable, identify that the connection to the first RAT is not maintainable, before identifying the over-temperature state, based on performing the at least one first operation and identifying that the over-temperature state is not resolved.

According to various embodiments, the at least one processor may be configured to, as at least part of an operation of identifying whether the connection to the first RAT is maintainable, based on the fact that at least one temperature measured in at least part of the electronic device is included in a first temperature range, identify that the connection to the first RAT is maintainable; and based on the at least one temperature being included in a second temperature range different from the first temperature range, identify that the connection to the first RAT is not maintainable. Advantageously, at the initial time point when the over-temperature state occurs, the electronic device performs an operation for resolving the over-temperature state while maintaining the connection to the current RAT, and thus transmission and reception of user data is performed more seamlessly and efficiently. However, when the over-temperature state is not resolved even after the threshold time has elapsed, the RAT is changed so that heat generation is eliminated even if the transmission and reception of user data is temporarily cut off thereby preventing the electronic device from overheating. Thus, by preventing the electronic device from overheating, the degradation in the performance of the electronic device is also prevented.

According to various embodiments, the at least one processor may be configured to, as at least part of an operation of identifying whether the connection to the first RAT is maintainable, based on the fact that a time elapsed after a time point at which the over-temperature state is identified is less than a threshold time, identify that the connection to the first RAT is maintainable; and based on the time elapsed after the time point at which the over-temperature state is identified being equal to or greater than the threshold time, identify that the connection to the first RAT is not maintainable. Advantageously, the electronic device performs an operation of resolving over-temperature while maintaining a connection to the current or the first RAT in the first temperature range, which is a relatively low temperature range, and thus transmission and reception of user data is performed more seamlessly and efficiently. However, in the second temperature range, which is a relatively high temperature range, the RAT is changed so that heat generation is eliminated even if the transmission and reception of user data is temporarily cut off thereby preventing the electronic device from overheating. Thus, by preventing the electronic device from overheating, the degradation in the performance of the electronic device is also prevented.

According to various embodiments, the at least one processor may be configured to, as at least part of an operation of identifying whether the connection to the first RAT is maintainable, when the reception strength of a downlink signal from a network of the first RAT is greater than a first threshold magnitude and/or when the transmission strength of an uplink signal to the network of the first RAT is less than a second threshold magnitude, identify that the connection to the first RAT is maintainable, electronic device determines the RAT not to be the weak electric field and therefore, performs an operation of resolving the over-temperature state while maintaining the connection to the current RAT, and thus the transmission and reception of user data is performed efficiently and seamlessly. Further, the at least one processor of the electronic device may be configured to, as at least part of an operation of identifying whether the connection for the first RAT is maintainable, when the reception strength of the downlink signal from the network of the first RAT is equal to or less than the first threshold magnitude and/or when the transmission strength of the uplink signal to the network of the first RAT is equal to or greater than the second threshold magnitude, identify that the connection to the first RAT is not maintainable. Advantageously, the electronic device determines the RAT to be the weak electric field, and therefore, the RAT change is performed so as to eliminate heat generation even if the transmission and reception of user data is temporarily cut off thereby preventing the electronic device from overheating. Thus, by preventing the electronic device from overheating, the degradation in the performance of the electronic device is also prevented.

In a case of a weak electric field, it is highly likely that the strength of the uplink signal from the electronic device is configured to have a relatively large magnitude, and thus there is a high possibility that the over-temperature state is not resolved. Accordingly, when the RAT is determined to be the weak electric field, as the electronic device advantageously performs the RAT change, the possibility of resolving the over-temperature state increases thereby preventing the electronic device from overheating.

According to various embodiments, the at least one processor may be configured to, as at least part of an operation of identifying whether the connection to the first RAT is maintainable, based on identifying that the electronic device is in use, identify that the connection to the first RAT is maintainable; and based on identifying that the electronic device is not in use, identify that the connection to the first RAT is not maintainable. Advantageously, when the electronic device is not in use, e.g., when there is no data displayed on the display module, since there is a low probability that transmission and/or reception of user data according to the RAT change is interrupted, the electronic device performs the RAT change upon identification of the over-temperature state. This prevents the electronic device from overheating by performing changing the RAT and also prevents the degradation in the performance of the electronic device.

According to various embodiments, the at least one processor may be further configured to, in a state of being connected to the second RAT according to performance of at least one second operation for establishing a connection to the second RAT, identify whether the over-temperature state has been resolved; perform at least one third operation for connection to the first RAT based on identifying that the over-temperature state has been resolved; and refrain from performing the at least one third operation for connection to the first RAT based on identifying that the over-temperature state has not been resolved.

According to various embodiments, the at least one processor may be further configured to perform the at least one first operation and then identify that the over-temperature state is resolved; and based on identifying that the over-temperature state has been resolved, perform at least one fourth operation for recovering a state of the electronic device changed according to the performance of the at least one first operation to a state before the performance of the at least one first operation.

According to various embodiments, as at least part of an operation of performing the at least one second operation for establishing a connection to the second RAT different from the first RAT based on identifying that the connection to the first RAT is not maintainable, the at least one processor may be configured to, based on identifying that the connection to the first RAT is not maintainable, identify whether waiting for an RRC release command from a network is possible; and perform the at least one second operation, which is identified according to whether waiting for the RRC release command from the network is possible. Advantageously, when the electronic device switches or changes the RAT according to RRC release command from the network, a more stable communication is performed since the electronic device does not declares RLF.

According to various embodiments, as at least part of an operation of performing the at least one second operation, which is identified according to whether waiting for the RRC release command is possible, the at least one processor may be configured to, based on identifying that waiting for the RRC release command is possible, identify whether information of SIB5 received from the network is identified; based on the identification of the information of the SIB5, perform a cell reselection procedure as at least a part of the at least one second operation based on the information of the SIB; and based on the information of the SIB5 not being identified, perform a scan for the second RAT as at least a part of the at least one second operation.

According to various embodiments, based on the identification of information of the SIB5, as at least part of an operation of performing the cell reselection procedure as at least a part of the at least one second operation based on the information of the SIB, the at least one processor may be configured to increase a Qrxlevmin value and/or a Qqualmin value among parameters of a first cell reselection condition corresponding to the first RAT, and/or decrease a Qrxlevmin value and/or a Qqualmin value among parameters of a second cell reselection condition corresponding to the second RAT, so as to adjust the first cell reselection condition and/or the second cell reselection condition; and based on the adjusted first cell reselection condition and/or the adjusted second cell reselection condition, perform selection of one cell as at least a part of the at least one second operation.

According to various embodiments, as at least part of an operation of performing the at least one second operation, which is identified according to whether waiting for the RRC release command is possible, the at least one processor may be configured to perform a scan for the second RAT as at least a part of the at least one second operation, based on identifying that waiting for the RRC release command is not possible.

According to various embodiments, as at least part of an operation of performing a scan for the second RAT as at least a part of the at least one second operation, based on identifying that waiting for the RRC release command is not possible, the at least one processor may be configured to perform a scan for the second RAT based on the information of SIB5 received from the network and/or the measurement object included in the measurement configuration.

According to various embodiments, as at least part of an operation of performing a scan for the second RAT as at least a part of the at least one second operation, based on identifying that waiting for the RRC release command is not possible, the at least one processor may be configured to transmit a measurement report message corresponding to A2 event, B1 event, and/or B2 event to the network based on identifying that waiting for the RRC release command is not possible; and perform a scan for the second RAT as at least a part of the at least one second operation based on the failure to receive a handover command corresponding to the measurement report message.

According to various embodiments, the at least one processor may be further configured to perform at least one fifth operation for handover to a target cell of the second RAT, based on receiving the handover command corresponding to the measurement report message.

According to various embodiments, as at least part of an operation of identifying whether waiting for the RRC release command from the network is possible, the at least one processor may be configured to identify whether waiting for the RRC release command is possible, based on a reception history of the previously received RRC release command and/or an application being executed by the electronic device. The electronic device performs a more stable communication since the electronic device does not declare RLF.

According to various embodiments, as at least part of an operation of identifying whether waiting for the RRC release command from the network is possible, the at least one processor may be configured to, based on the fact that at least one temperature measured in at least a part of the electronic device is included in a first temperature range, identify that waiting for the RRC release command is possible; and identify that waiting for the RRC release command is not possible, based on the at least one temperature being included in a second temperature range different from the first temperature range. Thus, the electronic device advantageously performs a more stable communication since the electronic device does not declare RLF.

According to various embodiments, as at least part of an operation of identifying whether waiting for the RRC release command from the network is possible, the at least one processor may be configured to, based on the fact that a time elapsed after a time point at which the over-temperature state is identified is less than a threshold time, identify that waiting for the RRC release command from the network is possible; and based on the fact that the time elapsed after the time point at which the over-temperature state is identified is equal to or greater than the threshold time, identify that waiting for the RRC release command from the network is not possible. Thus, the electronic device advantageously performs a more stable communication since the electronic device does not declare RLF.

According to various embodiments, as at least part of an operation of identifying whether waiting for the RRC release command from the network is possible, the at least one processor may be configured to, when the reception strength of a downlink signal from a network of the first RAT is greater than a first threshold magnitude and/or when the transmission strength of an uplink signal to the network of the first RAT is less than a second threshold magnitude, identify that waiting for the RRC release command from the network is possible; and when the reception strength of the downlink signal from the network of the first RAT is equal to or less than the first threshold magnitude and/or when the transmission strength of the uplink signal to the network of the first RAT is equal to or greater than the second threshold magnitude, identify that waiting for the RRC release command from the network is not possible. Thus, the electronic device advantageously performs a more stable communication since the electronic device does not declare RLF.

According to various embodiments, as at least part of an operation of identifying whether waiting for the RRC release command from the network is possible, the at least one processor may be configured to, based on identifying that the electronic device is in use, identify that waiting for the RRC release command is possible; and based on identifying that the electronic device is not in use, identify that waiting for the RRC release command is not possible. Thus, the electronic device advantageously performs a more stable communication since the electronic device does not declare RLF.

According to various embodiments, a method for operating an electronic device may include identifying an over-temperature state in a state of being connected to the first RAT; based on the identification of the over-temperature state, identifying whether a connection to the first RAT is maintainable; based on identifying that the connection to the first RAT is maintainable, performing at least one first operation corresponding to the over-temperature state while maintaining the connection to the first RAT; and based on identifying that the connection to the first RAT is not maintainable, performing at least one second operation for establishing a connection to a second RAT different from the first RAT. Advantageously, the method for operating the electronic device maintains the connection for the first RAT based on identifying that the connection for the first RAT is maintainable, and thus the transmission and reception of user data is performed as seamlessly as possible. However, when heat is intensified, even if the transmission and reception of user data is temporarily cut off, the RAT change is performed, for establishing a connection for the second RAT based on identifying that the connection for the first RAT is not maintainable, so as to eliminate heat thereby preventing the electronic device from overheating. Thus, by preventing the electronic device from overheating, the degradation in the performance of the electronic device is also prevented.

In addition, according to various embodiments, the combination of features as shown in and explained in connection with the drawings should not be understood as limiting the invention as such (in particular not to those features which are a part of the independent claims) but may nevertheless be understood to be disclosed as specific combinations of features as shown in those drawings.

In addition, according to various embodiments, since many features (in particular those features which are not part of the independent claims) are optional, the features of preferred embodiments have been described in connection with the word "may". Nevertheless, the preferred embodiments may be understood to be disclosed as specific preferred embodiments as shown in drawings and therefore the features shown in drawings are to understood as a real preferred combination of the present invention which however does not restrict the scope of the present invention.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art the various changes in form and detail may be made without departing from full scope of the disclosure, including the appended claims and their equivalents. It will also be understood that any of the embodiment(s) described herein may be used in conjunction with any other embodiment(s) described herein.

What is claimed is:

1. An electronic device comprising:
   at least one processor comprising processing circuitry;
   a sensor; and
   memory storing instructions that, when executed by the at least one processor individually or collectively, cause the electronic device to perform operations, the operations comprising:
   while a first connection to a first network is established based on a first radio access technology (RAT), identifying that the electronic device is in an over-temperature state based on sensing data from the sensor, and that an application currently being executed corresponds to a specified application,
   based on identifying that the electronic device is in the over-temperature state, and the application currently being executed corresponds to the specified application, releasing the first connection without receiving a connection release message from the first network,
   after the first connection is released, performing a scan associated with a second RAT different from the first RAT, and
   based on a result of the scan, establishing a second connection with a second network different from the first network based on the second RAT.

2. The electronic device according to the claim 1, wherein identifying that the application currently being executed corresponds to the specified application comprises:
   identifying that the application currently being executed corresponds to the specified application having a specified type or not.

3. The electronic device according to the claim 2, wherein the specified type comprises a type for which a time required for receiving the connection release message is greater than a threshold.

4. The electronic device according to the claim 2, further comprising a display, and
wherein releasing the first connection without receiving the connection release message comprises:
based on identifying that the application currently being executed corresponds to the specified type and that the display is turned-off, releasing the first connection without receiving the connection release message.

5. The electronic device according to the claim 2, wherein the operations comprise identifying that the application being executed does not correspond to the specified type.

6. The electronic device according to the claim 5, wherein the operations comprise releasing the first connection based on identifying that the connection release message is received, if the application being executed does not correspond to the specified type.

7. The electronic device according to the claim 1, wherein the operations comprise:
initiating a timer at a time point at which the over-temperature state is identified, and
releasing the first connection without receiving the connection release message based on lapse of the timer.

8. A method for operating an electronic device comprising a sensor, the method comprising:
while a first connection to a first network is established based on a first radio access technology (RAT), identifying that the electronic device is in an over-temperature state based on sensing data from the sensor, and that an application currently being executed corresponds to a specified application,
based on identifying that the electronic device is in the over-temperature state, and the application currently being executed corresponds to the specified application, releasing the first connection without receiving a connection release message from the first network,
after the first connection is released, performing a scan associated with a second RAT different from the first RAT, and
based on a result of the scan, establishing a second connection with a second network different from the first network based on the second RAT.

9. The method according to the claim 8, wherein identifying that the application currently being executed corresponds to the specified application comprises identifying that the application currently being executed corresponds to the specified application having a specified type is executed or not.

10. The method according to the claim 9, wherein the specified type comprises a type for which a time required for receiving the connection release message is executed is greater than a threshold.

11. The method according to the claim 9, wherein releasing the first connection without receiving the connection release message comprises:
based on identifying that the application currently being executed corresponds to the specified type and that a display of the electronic device is turned-off, releasing the first connection without receiving the connection release message.

12. The method according to the claim 9, further comprising identifying that the application being executed does not correspond to the specified type.

13. The method according to the claim 12, further comprising releasing the first connection based on identifying that the connection release message is received, if the application being executed does not correspond to the specified type.

14. The method according to the claim 8, further comprising:
initiating a timer at a time point at which the over-temperature state is identified; and
releasing the first connection without receiving the connection release message based on lapse of the timer.

15. A non-transitory computer readable medium storing instructions that, when executed by a processor of an electronic device, cause the electronic device to perform operations, the operations comprising:
while a first connection to a first network is established based on a first radio access technology (RAT), identifying that the electronic device is in an over-temperature state based on sensing data from a sensor, and that an application currently being executed corresponds to a specified application, p1 based on identifying that the electronic device is in the over-temperature state, and the application currently being executed corresponds to the specified application, releasing the first connection without receiving a connection release message from the first network,
after the first connection is released, performing a scan associated with a second RAT different from the first RAT, and
based on a result of the scan, establishing a second connection with a second network different from the first network based on the second RAT.

16. The non-transitory computer readable medium according to the claim 15, wherein identifying that the application currently being executed corresponds to the specified application comprises:
identifying that the application currently being executed corresponds to the specified application having a specified type or not.

17. The non-transitory computer readable medium according to the claim 16, wherein the specified type comprises a type for which a time required for receiving the connection release message is greater than a threshold.

18. The non-transitory computer readable medium according to the claim 16, wherein releasing the first connection without receiving the connection release message comprises:
based on identifying that the application currently being executed corresponds to the specified type and that a display of the electronic device is turned-off, releasing the first connection without receiving the connection release message.

19. The non-transitory computer readable medium according to the claim 16, wherein the operations comprise identifying that the application being executed does not correspond to the specified type.

20. The non-transitory computer readable medium according to the claim 19, wherein the operations comprise releasing the first connection based on identifying that the connection release message is received, if the application being executed does not correspond to the specified type.

21. The non-transitory computer readable medium according to the claim 15, wherein the operations comprise:
initiating a timer at a time point at which the over-temperature state is identified, and releasing the first connection without receiving the connection release message based on lapse of the timer.

\* \* \* \* \*